US008090628B2

(12) United States Patent
Shinohara et al.

(10) Patent No.: US 8,090,628 B2
(45) Date of Patent: Jan. 3, 2012

(54) LENS ORDER SYSTEM, LENS ORDER METHOD, LENS ORDER PROGRAM AND RECORDING MEDIUM STORING THE LENS ORDER PROGRAM

(75) Inventors: Toshihide Shinohara, Chinoshi (JP);
Tadashi Kaga, Minowa-machi (JP);
Ayumu Ito, Minowa-machi (JP)

(73) Assignee: Seiko Epson Corporation, Tokyo (JP)

( * ) Notice: Subject to any disclaimer, the term of this patent is extended or adjusted under 35 U.S.C. 154(b) by 1178 days.

(21) Appl. No.: 11/882,482

(22) Filed: Aug. 2, 2007

(65) Prior Publication Data
US 2008/0052194 A1   Feb. 28, 2008

(30) Foreign Application Priority Data

Aug. 4, 2006  (JP) ................................. 2006-213132
Oct. 26, 2006  (JP) ................................. 2006-291499

(51) Int. Cl.
*G06Q 30/00* (2006.01)
(52) U.S. Cl. ............ 705/26.82; 705/27.2; 703/1; 703/6; 703/11; 715/757; 351/200; 351/158.1
(58) Field of Classification Search .................. 703/1, 6, 703/11; 715/757; 351/200, 158, 2, 158.2; 705/26.82, 27.2
See application file for complete search history.

(56) References Cited

U.S. PATENT DOCUMENTS 5,280,570 A * 1/1994 Jordan ............................ 345/632
6,142,628 A * 11/2000 Saigo ............................. 351/204
6,329,989 B1 * 12/2001 Qi et al. ......................... 345/428
6,813,536 B1 * 11/2004 Gottschald ..................... 700/160
(Continued)

FOREIGN PATENT DOCUMENTS

EP         1 468 649 A1    10/2004
(Continued)

OTHER PUBLICATIONS

BusinessWire, "MIT Student Inventor Sees Clear Future in Desktop Printer for Low-Cost Eyeglass Lenses" dated Feb 19, 2004.*
(Continued)

*Primary Examiner* — Mark Fadok
(74) *Attorney, Agent, or Firm* — Sughrue Mion, PLLC

(57) ABSTRACT

A lens order system, includes: a server unit, including: a data recognizer that recognizes lens design detail data relating to design details of a lens; an image storage that stores object image data relating to an image of an object; an image recognizer that recognizes the object image data based on the lens design detail data; and an order reception section that recognizes order data relating to an order for a designed lens and generates order reception data, and a terminal unit connected with the server unit in a data transmittable manner, the terminal unit including: a data acquiring section that acquires the lens design detail data; a lens design section that designs the lens based on the lens design detail data; an image processor that superposes lens image data relating to an image of the designed lens designed by the lens design section on the object image data sent from the server unit and generates processed image data in which a superposing portion of the object image data and the lens image data is image-processed to provide a vision of the object image data through the designed lens; a display controller that displays the processed image data on a display; and an order section that generates the order data.

20 Claims, 19 Drawing Sheets

U.S. PATENT DOCUMENTS

| | | |
|---|---|---|
| 7,167,771 B2 | 1/2007 | Ito |
| 7,287,853 B2 * | 10/2007 | Toshima et al. ............... 351/205 |
| 7,914,148 B2 * | 3/2011 | Fisher et al. ................... 351/233 |
| 2001/0026351 A1 | 10/2001 | Gao et al. |
| 2004/0017499 A1 * | 1/2004 | Ambiru .................... 348/333.12 |
| 2004/0174499 A1 | 9/2004 | Toshima et al. |
| 2005/0073650 A1 * | 4/2005 | Ito ................................ 351/200 |

FOREIGN PATENT DOCUMENTS

| | | |
|---|---|---|
| EP | 1 515 179 A1 | 3/2005 |
| JP | 4-148906 A | 5/1992 |
| JP | 10-115808 A | 5/1998 |
| JP | 11-119172 A | 4/1999 |
| JP | 11-120213 A | 4/1999 |
| JP | 11-142797 A | 5/1999 |
| JP | 11-183856 A | 7/1999 |
| JP | 2000-29377 A | 1/2000 |
| JP | 2000-47153 A | 2/2000 |
| JP | 2000-47154 A | 2/2000 |
| JP | 2000-47155 A | 2/2000 |
| JP | 2000-107129 A | 4/2000 |
| JP | 2001-297323 A | 10/2001 |
| JP | 2005-91425 A | 4/2005 |
| JP | 2005-308490 A | 11/2005 |
| JP | 2006-343778 A | 12/2006 |
| WO | 03/057038 A1 | 7/2003 |
| WO | WO 03/081536 A1 | 10/2003 |

OTHER PUBLICATIONS

Yen et al., "Web-based Virtual Reality Catalog in Electronic Commerce", Proceedings of the 33$^{rd}$ Hawaii International Conference on System Sciences—2000.

* cited by examiner

LENS ORDER SYSTEM, LENS ORDER METHOD, LENS ORDER PROGRAM AND RECORDING MEDIUM STORING THE LENS ORDER PROGRAM

The entire disclosure of Japanese Patent Applications No. 2006-213132 filed Aug. 4, 2006 and No. 2006-291499 filed Oct. 26, 2006, is expressly incorporated by reference herein.

BACKGROUND

1. Technical Field

The present invention relates to a lens order system, a lens order method, a lens order program and a recording medium storing the lens order program by which a lens such as a spectacles lens is ordered.

2. Related Art

A lens design system has been known, in which design data of a lens is input in a terminal unit provided in a shop to be sent to a server unit provided on a manufacturer facility, where the lens is designed based on the lens design data received by the server unit (see, for example, JP-A-H10-115808).

In the system disclosed in JP-A-H10-115808, lens prescription data and a lens usage purpose of a spectacles lens user are input in the terminal unit. A computer of the terminal unit selects an optimal lens in accordance with lens evaluation data based on the input data and displays the lens on a display unit, the selected lens being online-ordered to the manufacturer.

In the above-described architecture, it is not possible to check an actual vision of the lens user with the ordered lens, so that the manufactured lens may not match the client.

To solve this problem, the terminal unit may be provided with simulation software for simulating on a display area of the display unit the lens user's vision with the ordered lens such that the lens user can order the lens after checking an actual vision through the lens.

However, to use such simulation software, plural pieces of image data displayed by the simulation software need to be prepared, so that the image data may excessively consume a storage area of a storage such as a hard disk (Hard Disk) of the terminal unit or may increase processing load for searching a desired piece of image data from the plural pieces of image data.

SUMMARY

An advantage of some aspects of the present invention is to provide, in consideration of the above described problems, a lens order system, a lens order method, a lens order program and a recording medium storing the lens order program by which a lens suitable for a lens user can be easily ordered.

A lens order system according to an aspect of the invention includes a server unit and a terminal unit connected with the server unit in a data transmittable manner. The server unit includes: a data recognizer that recognizes lens design detail data relating to design details of a lens; an image storage that stores object image data relating to an image of an object; an image recognizer that recognizes the object image data based on the lens design detail data; and an order reception section that recognizes order data relating to an order for a designed lens and generates order reception data. The terminal unit includes: a data acquiring section that acquires the lens design detail data; a lens design section that designs the lens based on the lens design detail data; an image processor that superposes lens image data relating to an image of the designed lens designed by the lens design section on the object image data sent from the server unit and generates processed image data in which a superposing portion of the object image data and the lens image data is image-processed to provide a vision of the object image data through the designed lens; a display controller that displays the processed image data on a display; and an order section that generates the order data. According to the aspect of the invention, the server unit includes the data recognizer that recognizes the lens design detail data, the image storage that stores the object image data, the image data recognizer that recognizes the object image data based on the lens design detail data and the order reception section that recognizes the order data and generates the order reception data.

The terminal unit includes the data acquiring section that acquires the lens design detail data, the lens design section that designs the lens, the image processor that superposes the lens image data on the object image data and generates the processed image data in which the image of the superposing portion is image-processed to show the vision of the image data through the designed lens, the display controller that controls the to display the processed image data and the order section that generates the order data.

Accordingly, on the terminal unit, the lens image data is superposed on the object image data and the processed image data in which the superposing portion is image-processed to show the lens user's vision of the object image data through the lens is generated and displayed on the display. Hence, the lens user can check the vision through the lens manufactured based on the prescription input as the lens design detail data before the lens is actually manufactured and delivered. Based on the processed image data, the processed image data can be corrected by the image processor of the terminal unit by correcting the lens design detail data, and the processed image data can be checked so that the most appropriate lens for the lens user can be designed and ordered.

The object image data can be sent from the server unit only by inputting the lens design detail data through an operation input on the terminal unit and sending the lens design detail data acquired by the data acquiring section through the input to the server unit, so that it is not necessary to store a large volume of object image data in the terminal unit. Hence, the terminal unit may not have the storage area for storing the object image data, thereby simplifying the structure of the terminal unit. In addition, since no processing is required such as a selecting a predetermined object image data from the plural pieces of the object image data, the processing load on the terminal unit can be reduced. The volume of the data transmitted between the terminal unit and the server unit is small, thereby reducing the communication load and time and smoothing the processing on the terminal unit.

A lens order system according to another aspect of the invention includes a server unit and a terminal unit connected with the server unit in a data transmittable manner. The server unit includes: a data recognizer that recognizes lens design detail data relating to design details of a lens; a lens design section that designs the lens based on the lens design detail data; an image storage that stores object image data relating to an image of an object; an image recognizer that recognizes the object image data based on the lens design detail data; and an order reception section that recognizes order data relating to an order for the designed lens and generates order reception data. The terminal unit includes: a data acquiring section that acquires the lens design detail data; an image processor that superposes lens image data relating to an image of the designed lens designed by the lens design section on the object image data sent from the server unit and generates processed image data in which a superposing portion of the object image data and the lens image data is image-processed to provide a vision of the object image data through the designed lens; a display controller that displays the processed image data on a display; and an order section that generates the order data.

According to the aspect of the invention, the server unit includes the data recognizer recognizes the lens design detail data, the lens design section that designs the lens based on the lens design detail data, the image storage that stores the object image data, the image data recognizer that recognizes the object image data based on the lens design detail data and the order reception section that recognizes the order data and generates the order reception data.

The terminal unit includes the data acquiring section that acquires the lens design detail data, the image processor that superposes the lens image data on the object image data and generates the processed image data in which the image of the superposing portion is image-processed to show the vision of the image data through the designed lens, the display controller that displays the processed image data on the display and the order section that generates the order data.

Accordingly, similarly to the above-described aspect of the invention, it is possible to superpose the lens image data on the object image data and generates the processed image data in which the superposing portion is image-processed to display the lens user's vision of the object image data through the lens on the display. Hence, the lens user can check the vision through the lens manufactured based on the prescription input as the lens design detail data before the lens is actually manufactured and delivered, which provides the same effects and advantages as the above-described aspect of the invention. The processed image data can be corrected by the image processor of the terminal unit by correcting the lens design detail data based on the processed image data, and the processed image data can be checked so that the most appropriate lens for the lens user can be designed and ordered.

Since the lens design section that designs the lens based on the lens design detail data is provided on the server unit, no lens designing processing is conducted on the terminal unit, thereby reducing the processing load on the terminal unit. Hence, even when the processing capability of the terminal units provided in the shops varies, since the server unit conducts the processing for designing the lens, excessive processing load will not be placed on the terminal units, thereby preventing an increase in processing load placed on a low-performance terminal unit and enable a smooth processing.

Similarly to the above-described aspect of the invention, it is not necessary to store a large volume of the object image data in the terminal unit, so that the structure of the terminal unit can be simple. In addition, it is not necessary to select a predetermined object image data from the plural pieces of the object image data, thereby reducing the processing load on the terminal unit. Further, since the volume of the data transmitted between the terminal unit and the server unit is small, the communication load and time can be reduced, so that the processing on the terminal unit can be smooth.

In the lens order system according to the aspect of the invention, the image storage may store plural pieces of the lens image data relating to an image of a lens. The image recognizer may recognize, based on the lens design detail data, lens image data of a lens corresponding to the design details of the lens design detail data from the plural pieces of the lens image data. The image processor may superpose the lens image data recognized by the image recognizer on the object image data and generates processed image data in which a superposing portion of the object image data and the lens image data is image-processed to provide a vision of the object image data through the designed lens designed based on the lens design detail data.

According to the aspect of the invention, the image recognizer recognizes the lens image data of the lens corresponding to the design details of the lens design detail data from the plural pieces of the lens image data stored in the image storage, the image processor generating the processed image data in which the lens image data is superposed on the object image data. Hence, it is only necessary for the image processor to superpose the lens image data recognized by the image recognizer on the object image data, thereby facilitating the generation of the processed image data. Similarly to the object image data, the lens image data is stored in the image storage in the server unit, it is not necessary to store the lens image data in each terminal unit, thereby preventing the storage area of the terminal unit from being excessively consumed. No searching for the lens image data in the terminal unit is required, so that processing load on the terminal unit can be reduced.

In the lens order system according to the aspect of the invention, the lens design detail data may include lens prescription data on a lens prescription for a lens user. The lens design section may design a lens in accordance with the lens prescription of the lens prescription data.

According to the aspect of the invention, the lens design section designs the lens based on the lens prescription data of the lens design detail data. Hence, the lens design section can design the corresponding to the lens prescription desired by the lens user. Since the image processor creates the processed image data based on the designed lens, the lens user can easily check the vision through the lens in accordance with the lens prescription data. Hence, since the lens user can easily check the desired lens before manufacturing the lens, it is possible to manufacture the lens desired by the lens user.

In the lens order system according to the aspect of the invention, the lens design detail data may include vision data on the vision of the lens user. The image processor may generate based on the vision data processed data in which the object image data is image-processed to provide a vision of the object image data of the lens user with naked eyes and superposes the lens image data on the generated processed data to image-process a superposing portion of the processed data and the lens image data to provide a vision of the lens user of the object image data through the designed lens.

According to the aspect of the invention, the image processor creates, based on the vision data of the object image data, the processed image data in which the lens image data is superposed on the processed image data image-processed to show the lens user's vision of the object image data with naked eyes. Accordingly, since the image processor creates the processed image data based on the vision data of the lens user, the volume of the object image data stored in the image storage of the server unit can be reduced, thereby promoting more efficient use of the storage such as a hard disc of the server unit.

In the lens order system according to the aspect of the invention, the lens design detail data may include vision data on the vision of the lens user. The image storage may store plural pieces of the object image data corresponding to the vision of the lens user. The image recognizer may recognize the object image data corresponding to the vision of the lens user out of the plural pieces of the object image data based on the vision data.

According to the aspect of the invention, the image data recognizer of the server unit recognizes the object image data corresponding to the vision data of the lens user from the image storage and sends the recognized object image data to the terminal unit. The image processor of the terminal unit can easily generate the processed image data only by superposing the lens image data on the recognized object image data and image-processing the superposing portion. Hence, the processing load for the image processing of the object image data can be reduced, thereby reducing the processing load on the terminal unit.

In the lens order system according to the aspect of the invention, the lens design detail data may include lens form design data on a design of a lens form. The image processor may superpose lens image data corresponding to the lens form of the lens design detail data on the object image data.

According to the aspect of the invention, the image processor superposes the lens image data of the lens form of the lens design detail data on the object image data. Accordingly, the lens user can check the processed image data to judge whether or not the lens form is suitable before a production of the lens. Accordingly, the lens having an appropriate form that fits the lens user can be ordered.

In the lens order system according to the aspect of the invention, the lens design detail data may include lens usage purpose data relating to a usage purpose of the lens by the lens user. The lens design section may design a lens having characteristics corresponding to the usage purpose of the lens of the lens usage purpose data. The image recognizer may recognize object image data corresponding to the usage purpose of the lens based on the lens usage purpose data.

According to the aspect of the invention, the lens design section designs the lens corresponding to the lens usage purpose data, and the image data recognizer recognizes the object image data corresponding to the lens usage purpose data. For example, when the lens usage purpose data indicates the use for deskwork, the lens design section designs the lens for near distance lens, and the image data recognizer recognizes the object image data in which an image of newspaper or a display screen or a keyboard of a personal computer is disposed in the reach of the lens user. When data indicating that the lens is used for a far distance purpose such as playing golf and bird watching is stored as the lens usage purpose data, the lens design section designs the lens for far vision and the image data recognizer recognizes the object image data in which an image such as a mountain and a building is disposed apart from the lens user by a predetermined distance or more.

Accordingly, since the lens design section designs the lens in accordance with the lens usage purpose of the lens user, it is possible to more appropriately design the lens as the lens user desires. Since the image data recognizer recognizes the object image data in which the image is disposed at a position corresponding to the lens usage purpose of the lens user, it is possible to generate the processed image data by the image processor with object image data disposed in accordance with the lens usage purpose data. By superposing the lens image data on the object image data, the lens user can check the processed image data when the image corresponding to the usage purpose is seen through the lens. Hence, the lens user can select a lens suitable for the usage purpose of the lens before manufacturing the lens, so that a more appropriate lens can be ordered.

In the lens order system according to the aspect of the invention, the lens usage purpose data may be usage distance data relating to a distance to an object to the lens user wearing a lens. The lens design section may design a lens having distance characteristics corresponding to the distance in which the lens is used of the usage distance data. The image recognizer may recognize the object image data relating to an image of an object disposed at a distance corresponding to the usage distance data.

According to the aspect of the invention, the lens usage purpose data includes the usage distance data on a distance from the lens to the to-be-seen object. Accordingly, since the distance between the lens and the to-be-seen object is clearly recognized, the lens design section can more reliably design the lens in accordance with the lens usage purpose and the image data recognizer can recognize the object image data in which an image is disposed at a distance by the distance from the lens to the to-be-seen object. Hence, the lens can be designed more appropriately as the lens user desires, and the processed image data can be more appropriately generated.

In the lens order system according to the aspect of the invention, the image processor may superpose the lens image data on the object image data and may generate motion picture data to be moved on the object image data.

According to the aspect of the invention, the image processor generates the motion picture data in which the lens image data is moved on the image data. Accordingly, it is possible to simulate distortion and the like generated by the movement of the lens while the lens user sees the image with the lens corresponding to the design lens data. Hence, owing to the motion picture data, it is possible to more appropriately simulate the usage of the lens. Thus, it is possible to more appropriately assist the lens user in ordering the lens, so that a lens more appropriate for the lens user can be ordered.

In the lens order system according to the aspect of the invention, the terminal unit may include a lens movement request recognizer that recognizes lens movement request data relating to a movement of the lens of the motion picture data. Based on the lens movement request data, the image processor may generate motion picture data on which the lens image data is moved in a predetermined movement.

According to the aspect of the invention, the terminal unit recognizes the lens movement request data and the image processor generates the motion picture data in which the lens image data is moved in accordance with the lens movement request data. Accordingly, the motion picture data in which the lens image data is moved in such a movement as the user desires can be displayed on the display. Hence, the user can check the characteristics of the lens and whether the lens matches his preference, thereby more appropriately assisting the lens user to select an appropriate lens.

A lens order method includes, on a terminal unit connected to a server unit in a data transmittable manner, acquiring lens design detail data relating to setting details of a lens; and sending the lens design detail data to the server. The lens order method includes, on the server unit, recognizing the lens design detail data relating to the setting details of the lens sent from the terminal unit; recognizing object image data relating to an object image to be seen through the lens based on the lens design detail data; and sending the recognized object image data to the terminal unit The lens order method includes, on the terminal unit, designing the lens based on the lens design detail data; superposing lens image data relating to an image of the designed lens on the object image data sent from the server unit and generating processed image data in which a superposing portion of the object image data and the lens image data is image-processed to provide a vision of the object image data through the designed lens; displaying the generated processed image data on a display; generating order data relating to an order for the designed lens; and sending the order data to the server unit. The lens order method includes, on the server unit, receiving the order data; and generating received data.

According to the aspect of the invention as describe above, the lens image data is superposed on the object image data and the processed image data in which the superposing portion is image-processed to show the lens user's vision of the object image data through the lens is displayed on the display. Hence, the lens user can check the vision with the ordered lens before the lens is actually manufactured and delivered, so that, by correcting the lens design detail data based on the processed image data, the lens most suitable for the lens user can be designed.

Since only the lens design detail data, the order data and the object image data are transmitted between the terminal unit and the server, the communication load will be small, so that the communalization speed can be increased. Hence, operations on the terminal unit can be smooth.

Further, since the terminal unit generates the processed image data using the object image data sent from the server unit, it is not necessary to store the plural pieces of the object image data in the terminal unit, thereby preventing the storage area of the terminal from being excessively consumed.

A lens order method includes, on a terminal unit connected to a server unit in a data transmittable manner, acquiring lens design detail data relating to setting details of a lens; and sending the lens design detail data to the server. The lens order method includes, on the server unit, recognizing the lens design detail data relating to the setting details of the lens sent from the terminal unit; designing the lens based on the lens design detail data; recognizing object image data relating to an object image to be seen through the lens; and sending the recognized object image data and lens image data relating to the designed lens to the terminal unit. The lens order method includes, on the terminal unit, superposing the lens image data on the object image data based on the object image data and the lens image data which are sent from the server unit; generating processed image data in which a superposing portion of the object image data and the lens image data is image-processed to provide a vision of the object image data through the designed lens; displaying the generated processed image data on a display; generating order data relating to an order for the designed lens; and sending the order data to the server unit. The lens order method includes, on the server unit, receiving the order data; and generating received data.

According to the aspect of the invention as describe above, the lens image data is superposed on the object image data and the processed image data in which the superposing portion is image-processed to display the lens user's vision of the object image data through the lens on the display. Hence, the lens user can check the vision with the ordered lens before the lens is actually manufactured and delivered and correct the lens design detail data based on the processed image data, so that the most suitable lens for the lens user can be designed.

Since only the lens design detail data, the order data and the object image data are transmitted between the terminal unit and the server unit, the communication load can be small and the communalization speed can be increased. Hence, operations on the terminal unit can be smooth.

Since the lens is designed on the server unit, no lens designing processing is conducted on the terminal unit, thereby reducing the processing load on the terminal unit. Further, since the terminal unit generates the processed image data using the object image data sent from the server unit, it is not necessary to store the plural pieces of the object image data in the terminal unit, thereby preventing the storage area of the terminal from being excessively consumed. Hence, the structure of the terminal unit can be simple and even when the terminal unit has a CPU (Central Processing Unit) of low performance or the terminal unit has a recording device such as a Hard Disk with a small storage capacity, the above-described lens order method can be conducted.

A lens order program according to an aspect of the invention operates a computer as the lens order system.

According to the aspect of the invention, the lens order program operates a computer as the above-described lens order system. Hence, as described above, the lens user can check the vision with the ordered lens before the lens is actually manufactured and delivered, so that the lens can be designed most appropriately for the lens user and a suitable lens can be ordered. In addition, the communication load between the terminal unit and the server unit can be reduced, so that operations can be smooth.

A lens order program according to an aspect of the invention operates a computer to perform the above-described lens order method.

According to the aspect of the invention, the lens order program operates a computer as the above-described lens order system. Hence, as described above, the lens user can check the vision with the ordered lens before the lens is actually manufactured and delivered, so that the lens can be designed most appropriately for the lens user and a suitable lens can be ordered. In addition, the communication load between the terminal unit and the server unit can be reduced, so that operations can be smooth.

A recording medium according to an aspect of the invention stores the above-described lens order program in a manner readable by a computer.

According to the aspect of the invention, the recording medium stores the above-described lens order program in a manner readable by a computer. Hence, the computer can execute the lens order program only by operating the computers of the server unit and the terminal unit to read the recording medium.

BRIEF DESCRIPTION OF THE DRAWINGS

The invention will be described with reference to the accompanying drawings, wherein like numbers reference like elements.

DESCRIPTION OF EXEMPLARY EMBODIMENT(S)

First Exemplary Embodiment

Figure 1:
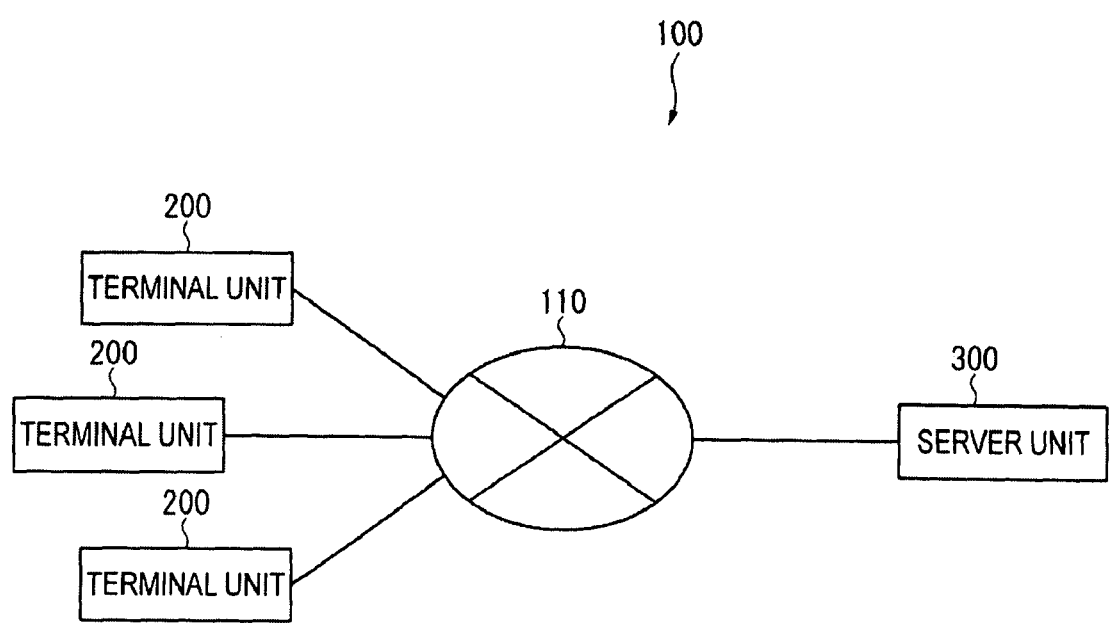
FIG. 1 is a block diagram schematically showing an overall architecture of a lens order system according to a first exemplary embodiment of the invention.

A lens order system according to a first exemplary embodiment of the invention will be described below with reference to the drawings. FIG. 1 is a block diagram schematically showing an overall architecture of a lens order system according to a first exemplary embodiment of the invention.

Figure 2:
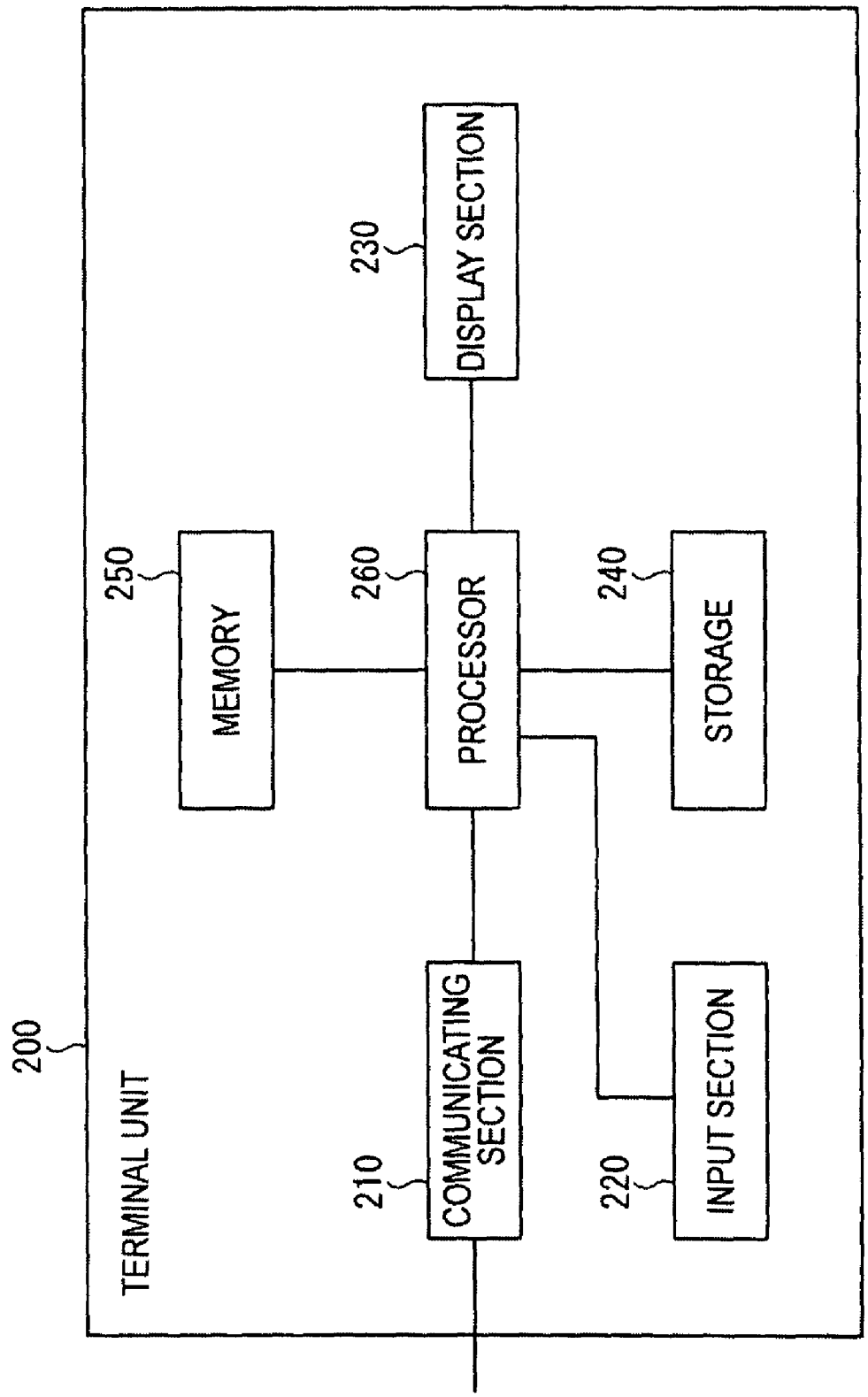
FIG. 2 is a block diagram schematically showing an overall architecture of the terminal unit of the first exemplary embodiment.
Figure 3:
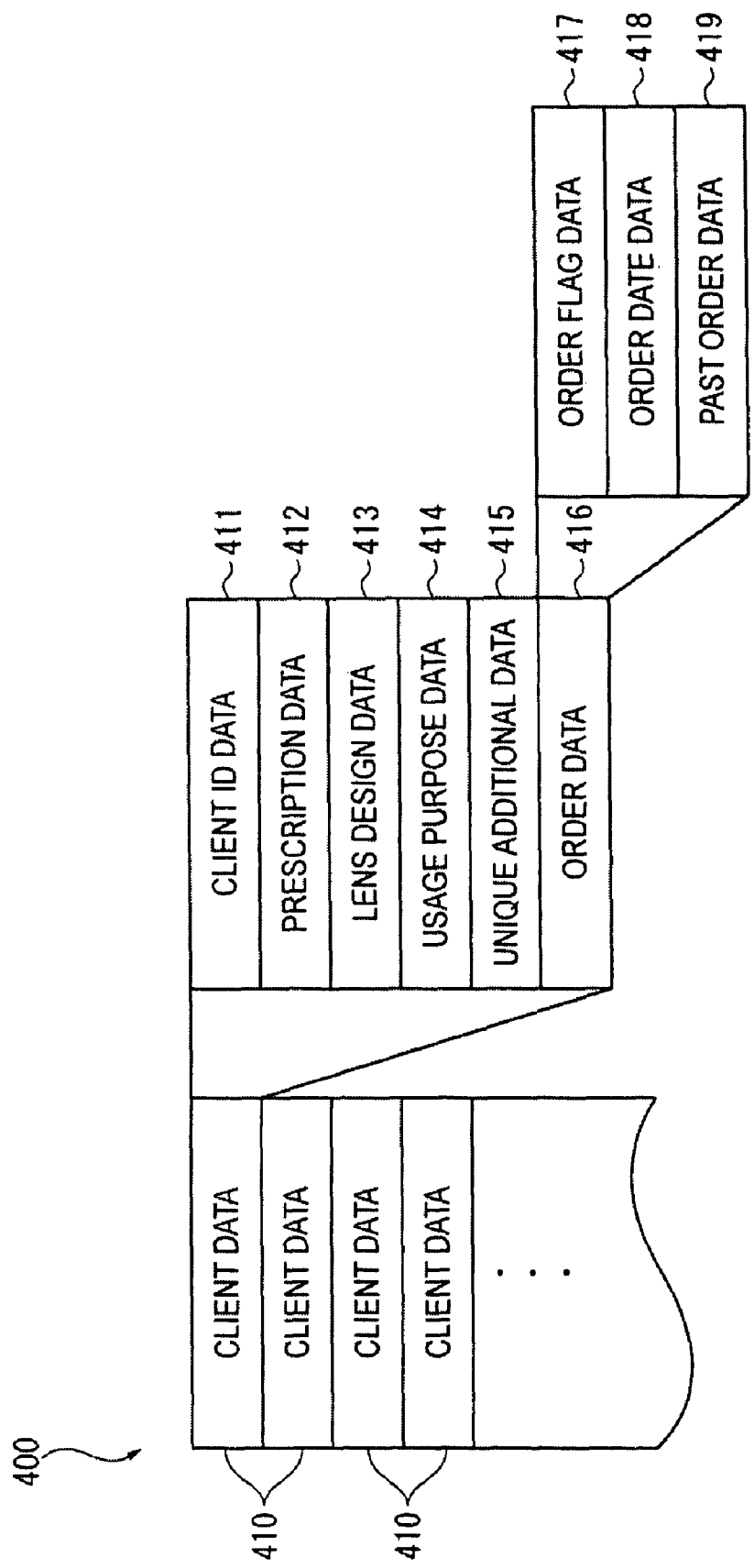
FIG. 3 schematically shows an architecture of a client data table stored in a storage of the terminal unit.
Figure 4:
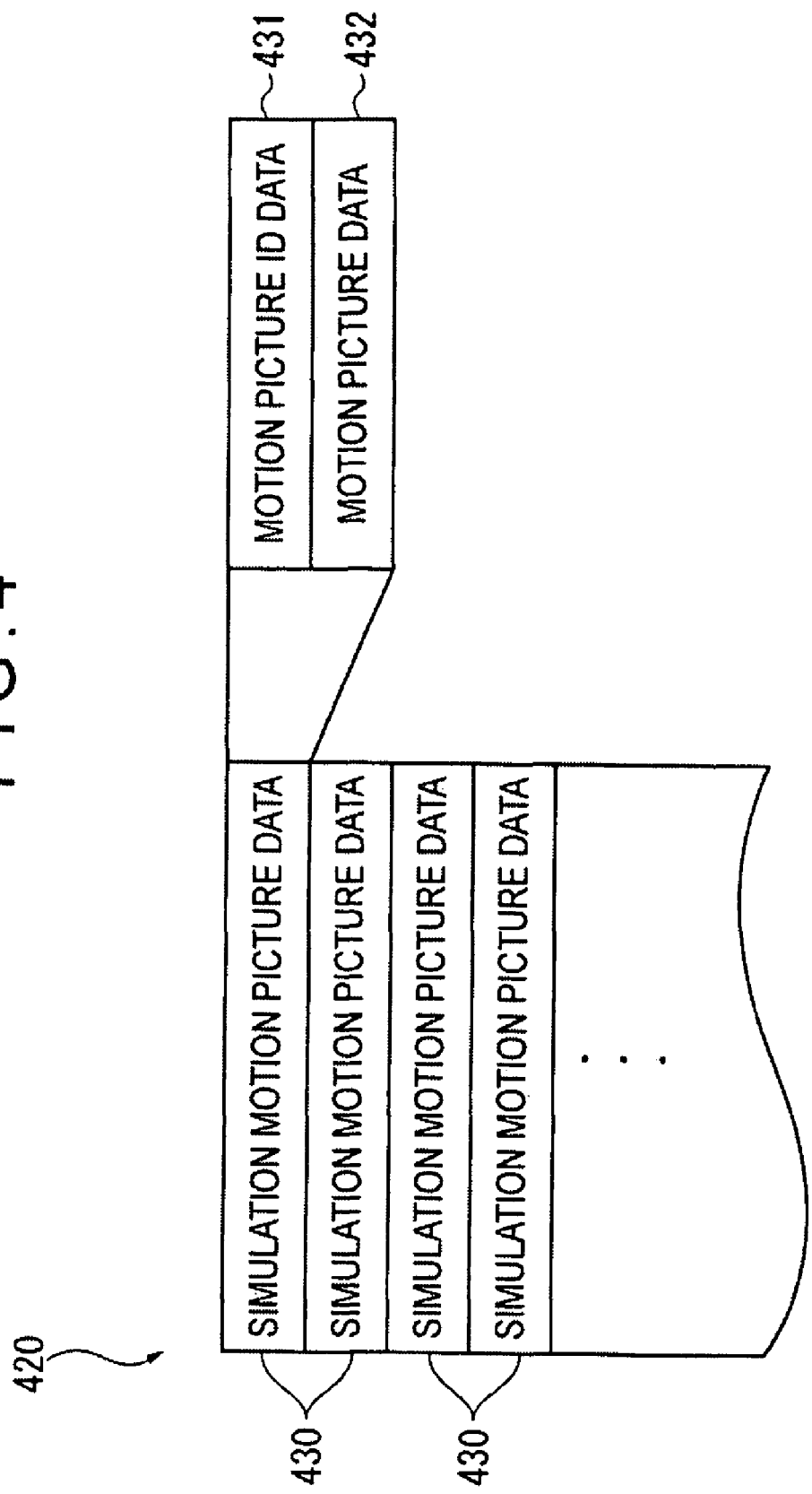
FIG. 4 shows an architecture of a simulation motion picture table stored in the storage of the terminal unit.
Figure 5:
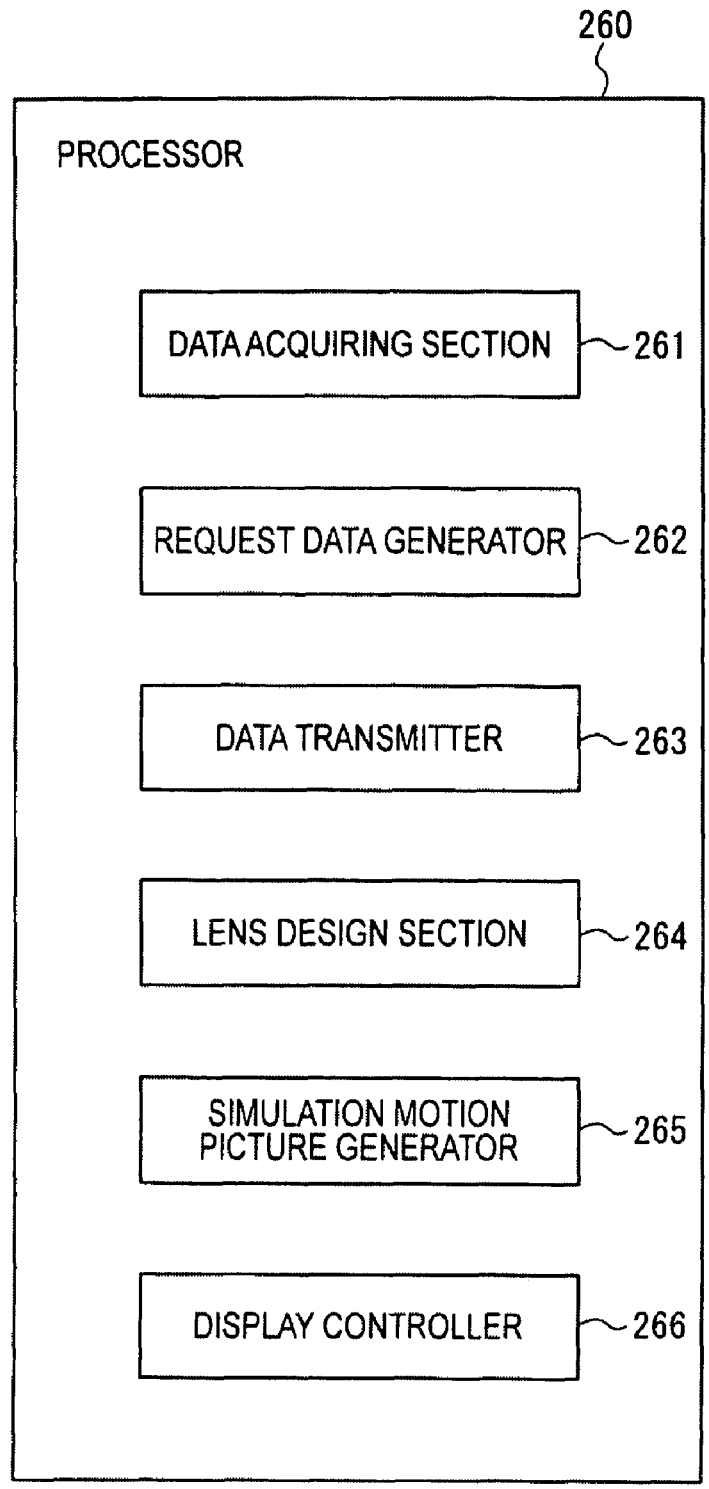
FIG. 5 is a block diagram schematically showing an overall architecture of a processor of the terminal unit of the first exemplary embodiment.
Figure 6:
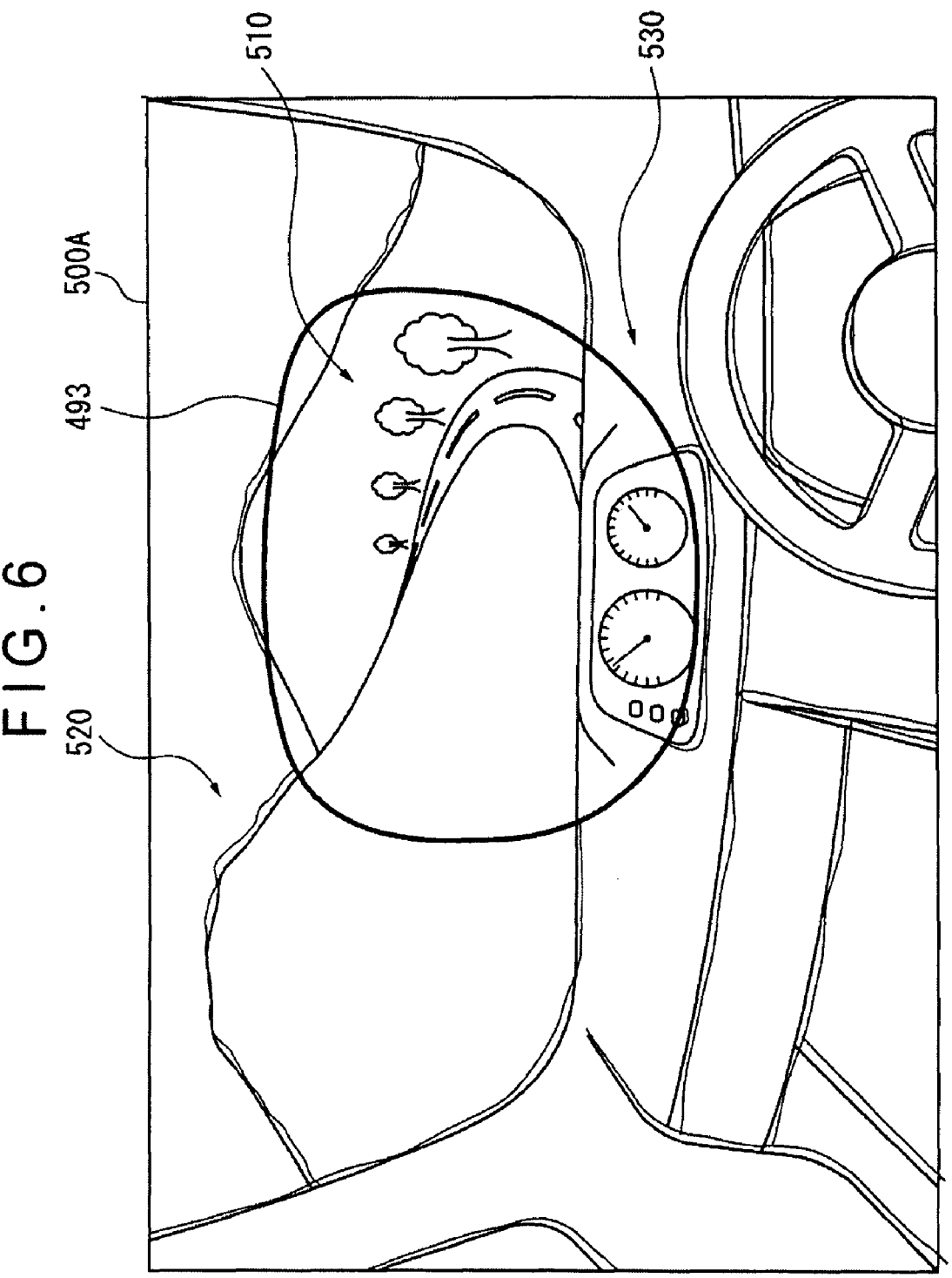
FIG. 6 shows simulation motion picture data for a far-middle lens.
Figure 7:
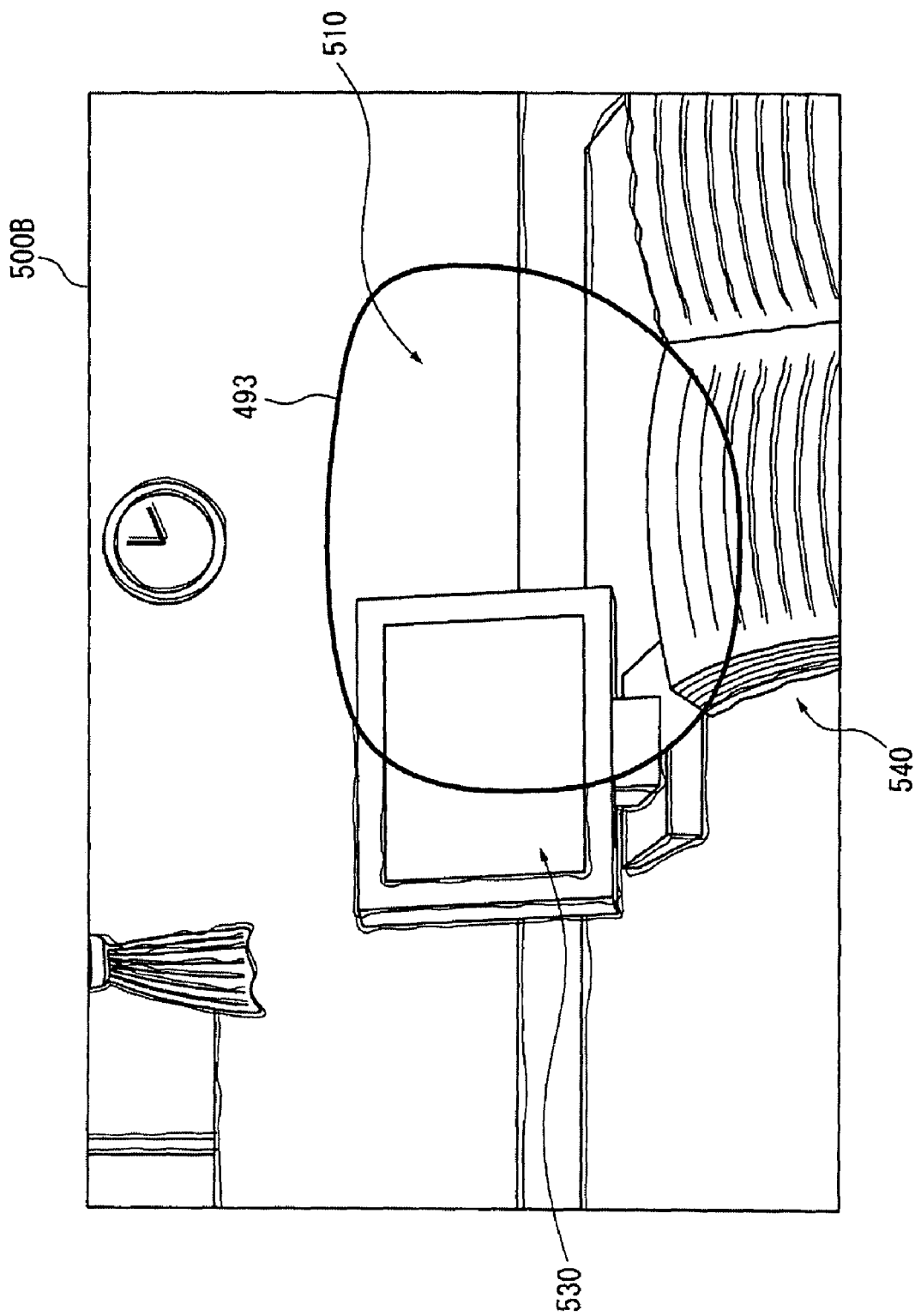
FIG. 7 shows simulation motion picture data for a middle-near lens.
Figure 8:
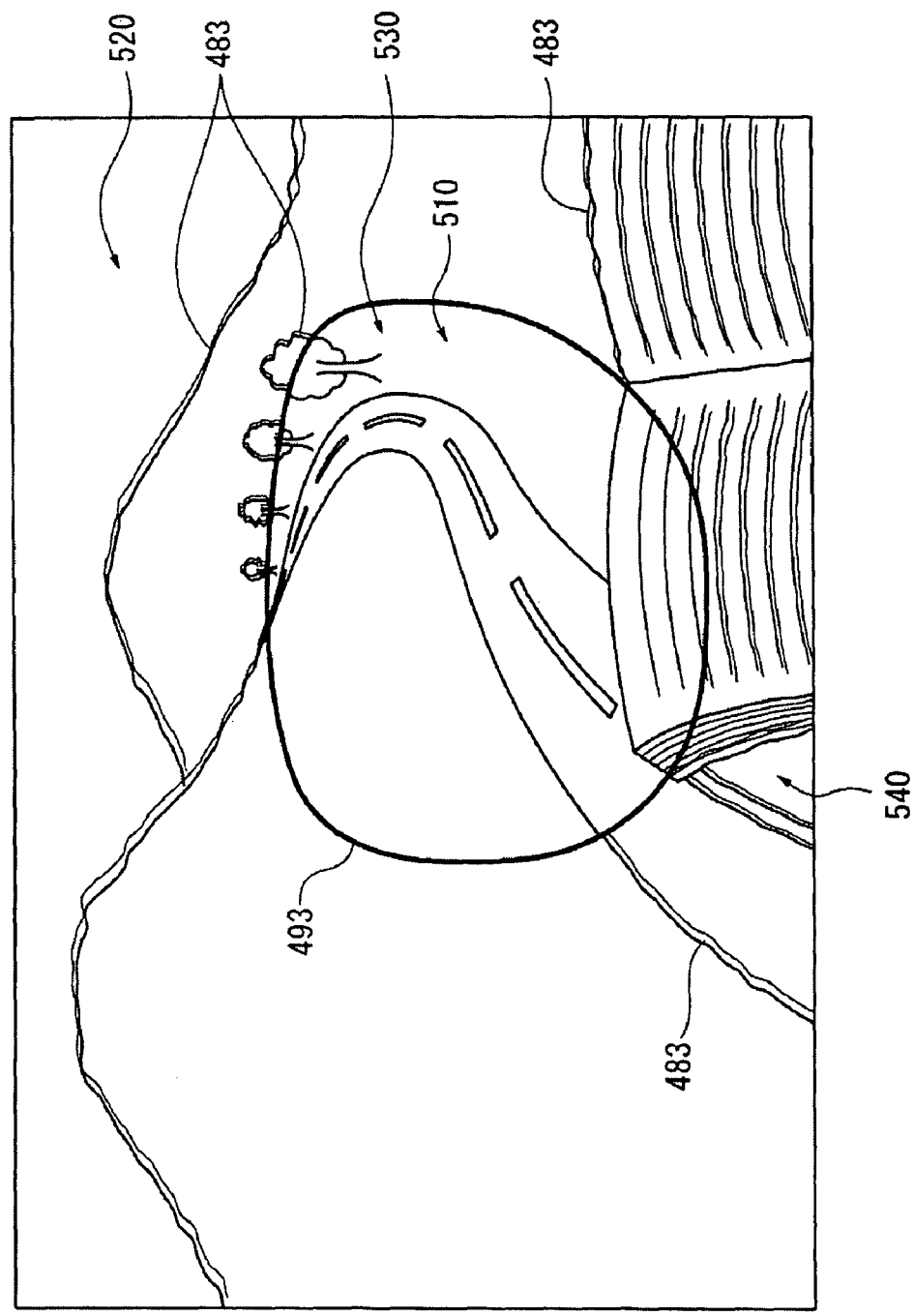
FIG. 8 shows simulation motion picture data for a far-near lens.
Figure 9:
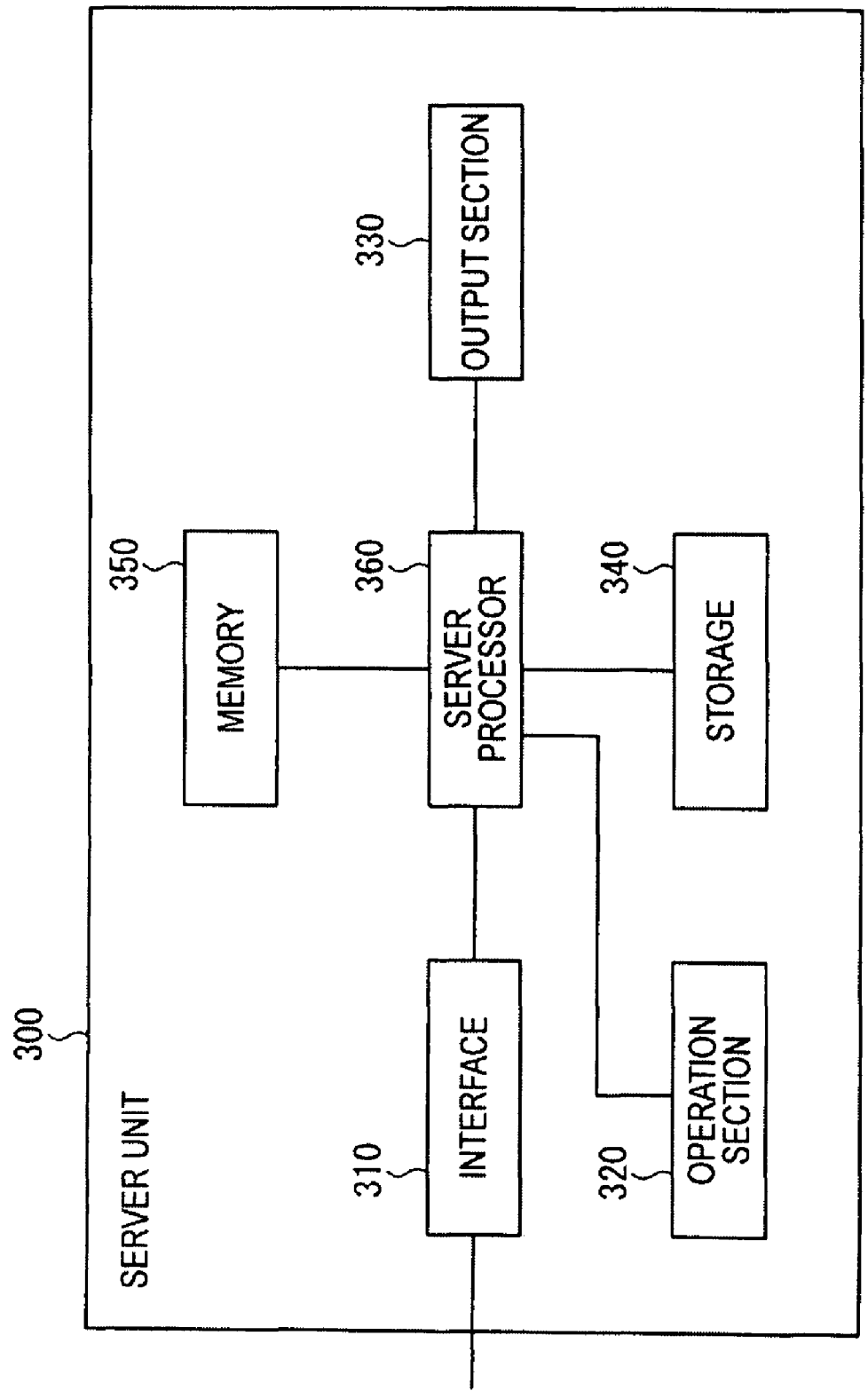
FIG. 9 is a block diagram schematically showing an overall architecture of a server unit of the first exemplary embodiment.
Figure 10:
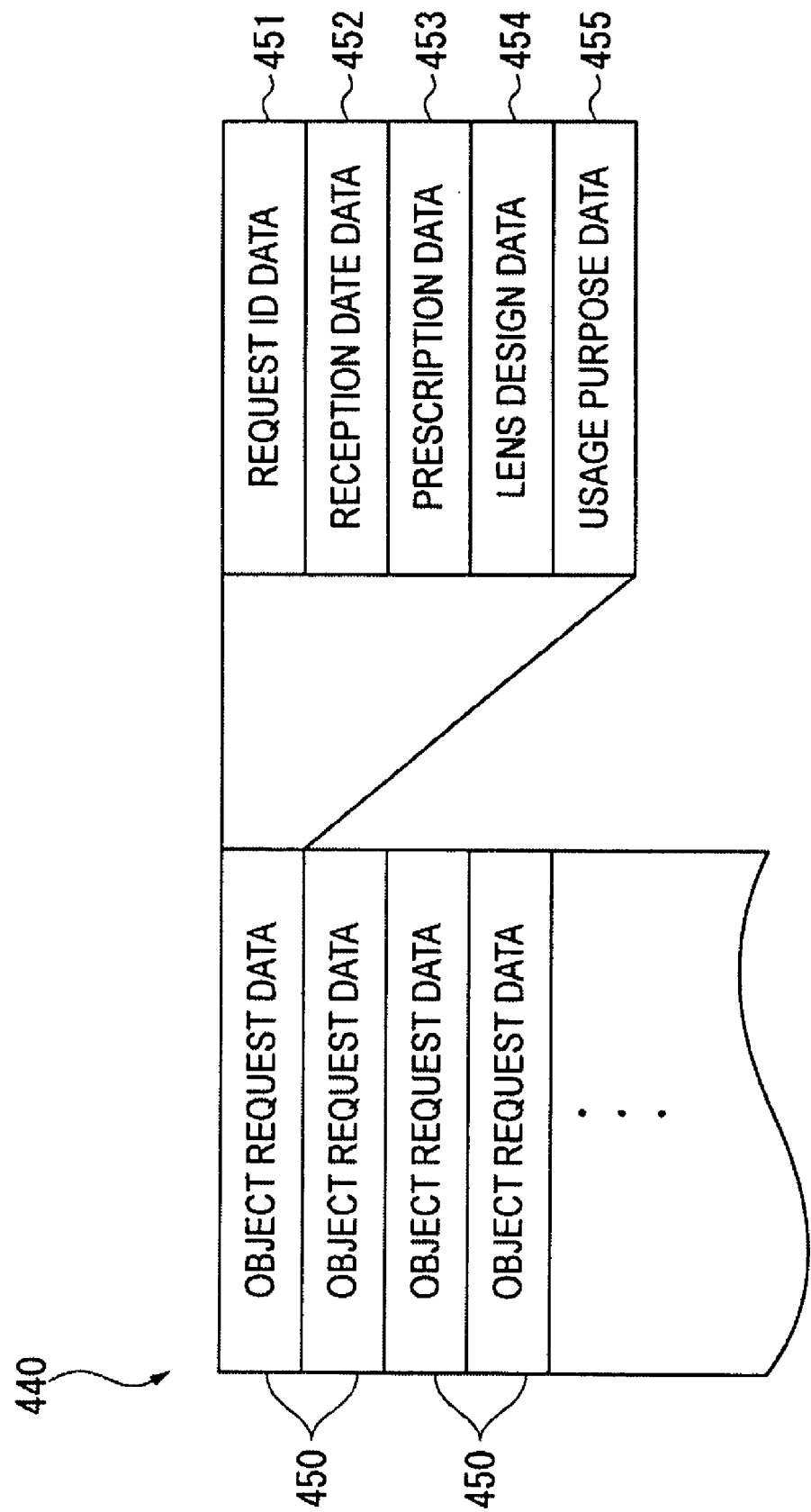
FIG. 10 schematically shows an architecture of an object request table stored in the storage of the server unit.
Figure 11:
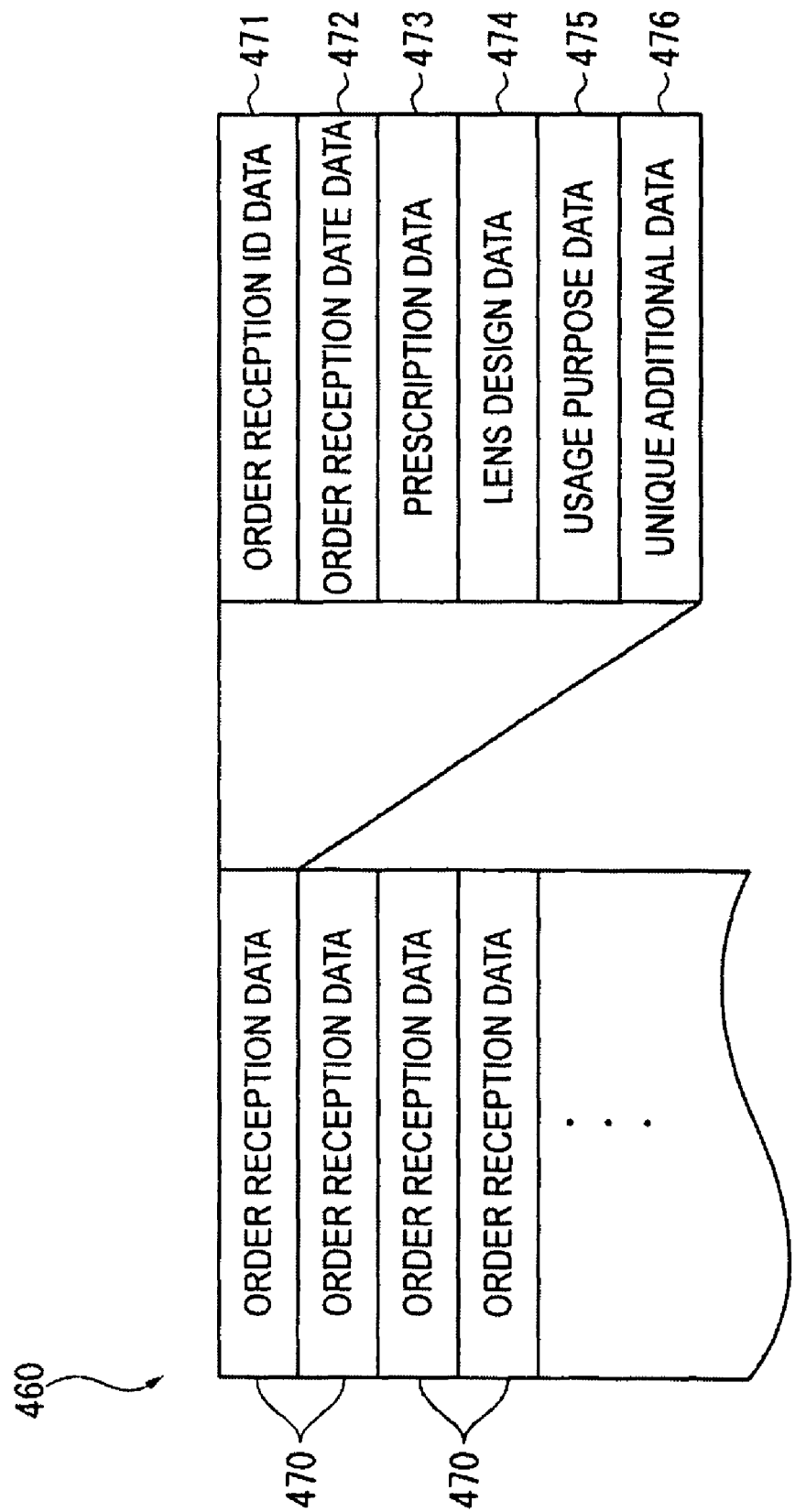
FIG. 11 schematically shows an architecture of an order reception table stored in the storage of the server unit.
Figure 12:
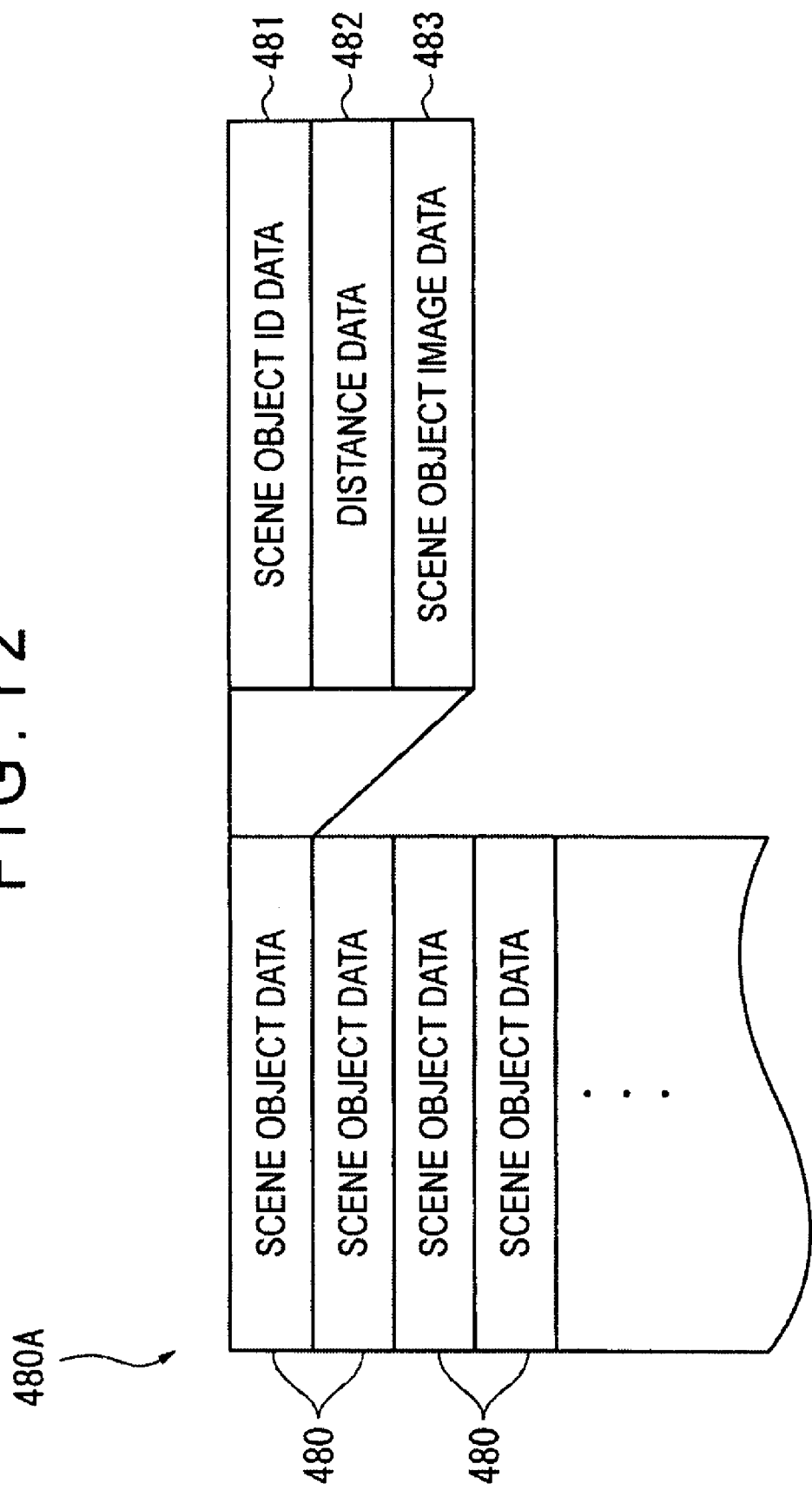
FIG. 12 schematically shows an architecture of a scene object table stored in the storage of the server unit.
Figure 13:
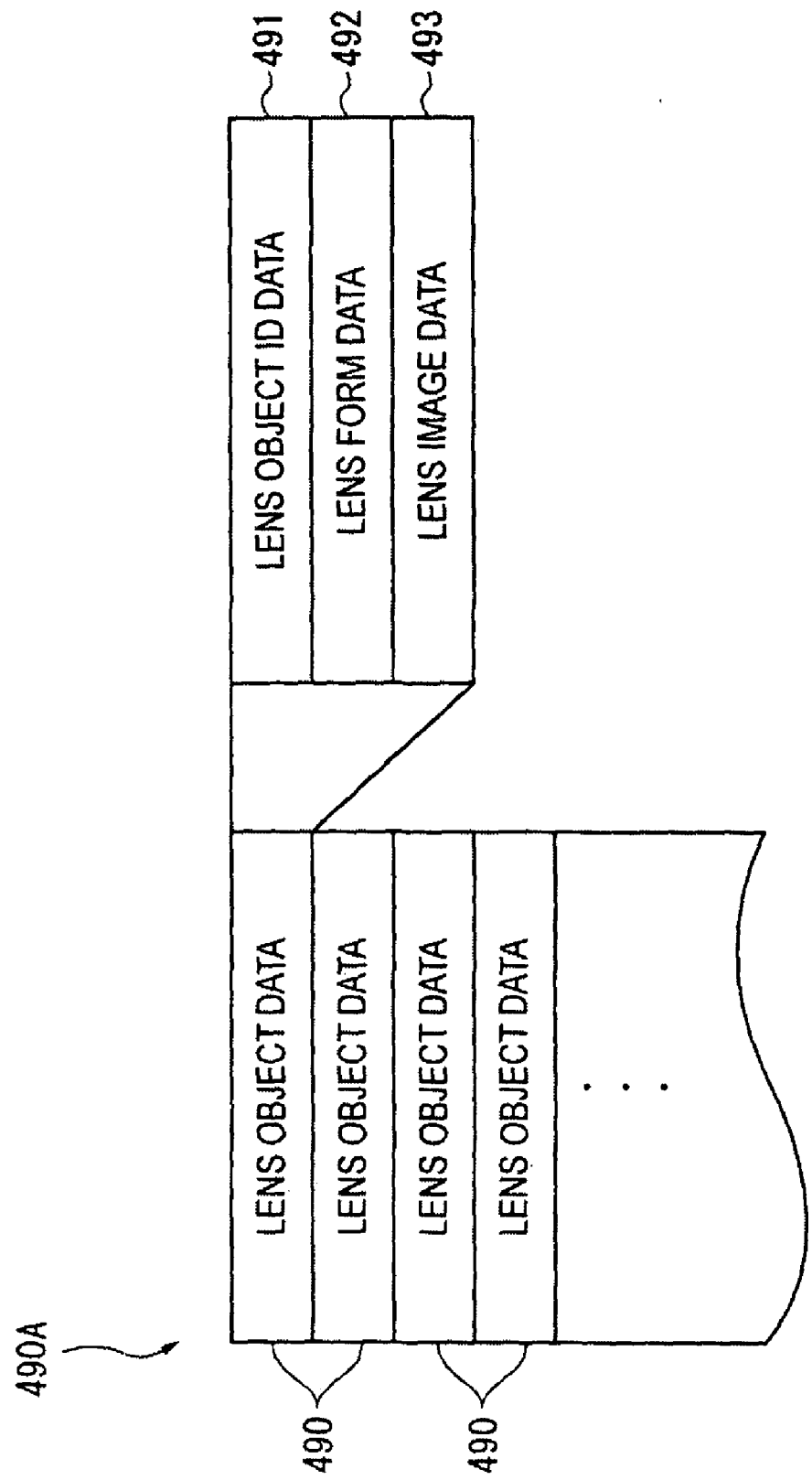
FIG. 13 schematically shows an architecture of a lens object table stored in the storage of the server unit.
Figure 14:
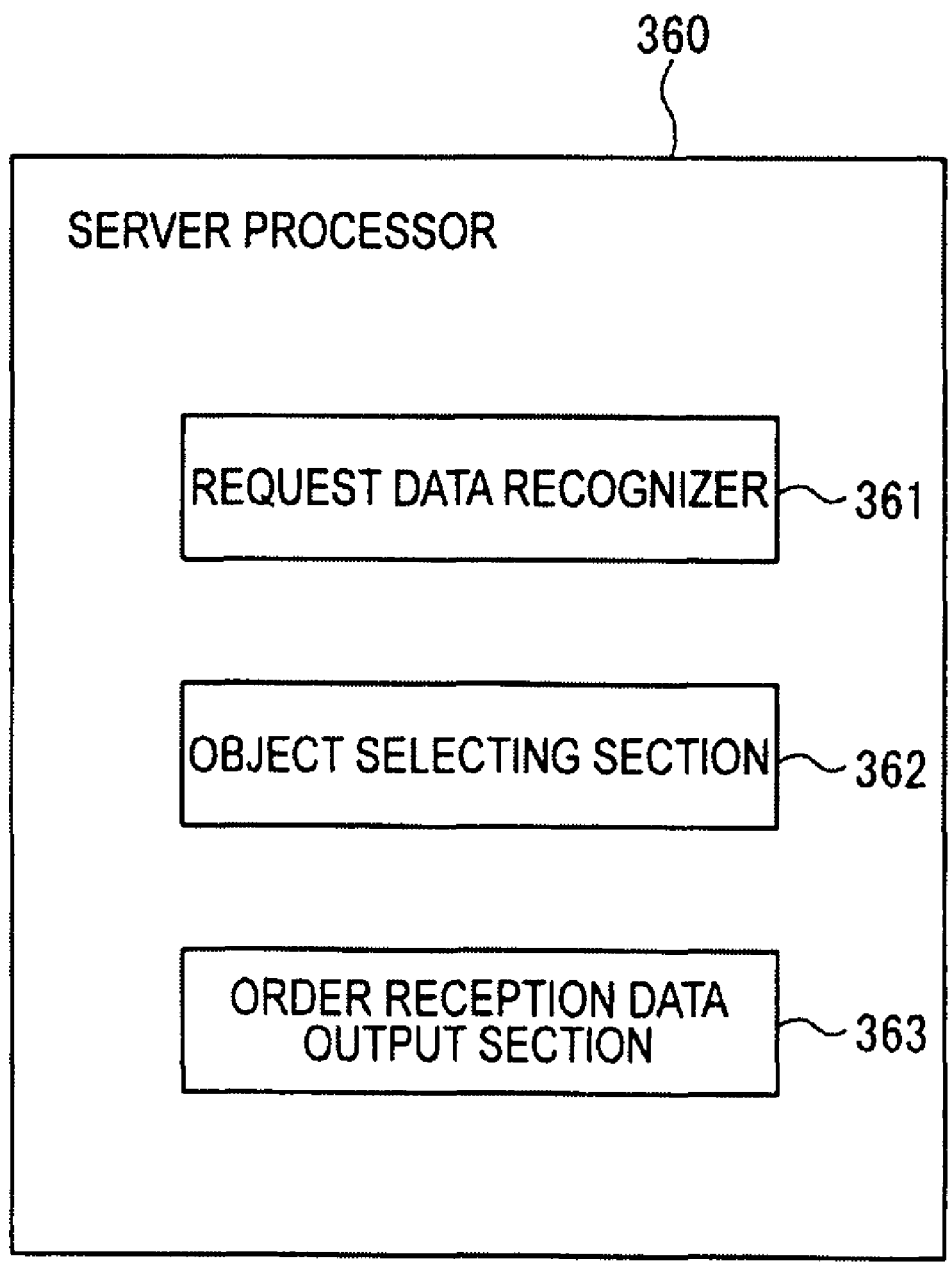
FIG. 14 is a block diagram schematically showing an overall architecture of a server processor of the server unit of the first exemplary embodiment.

FIG. 2 is a block diagram schematically showing an overall architecture of the terminal unit of the first exemplary embodiment. FIG. 3 schematically shows an architecture of a client data table stored in a storage of the terminal unit. FIG. 4 shows an architecture of a simulation motion picture table stored in the storage of the terminal unit. FIG. 5 is a block diagram schematically showing an overall architecture of a processor of the terminal unit of the first exemplary embodiment. FIG. 6 shows simulation motion picture data for a far-middle lens. FIG. 7 shows simulation motion picture data for a middle-near lens. FIG. 8 shows simulation motion picture data for a far-near lens. FIG. 9 is a block diagram schematically showing an overall architecture of a server unit of the first exemplary embodiment. FIG. 10 schematically shows an architecture of an object request table stored in the storage of the server unit. FIG. 11 schematically shows an architecture of an order reception table stored in the storage of the server unit. FIG. 12 schematically shows an architecture of a scene object table stored in the storage of the server unit. FIG. 13 schematically shows an architecture of a lens object table stored in the storage of the server unit. FIG. 14 is a block diagram schematically showing an overall architecture of a server processor of the server unit of the first exemplary embodiment.

Architecture of Lens Order System

In FIG. 1, a lens order system 100 includes a network 110, a plurality of terminal units 200 and a server unit 300. The lens order system 100 is a communication system in which the terminal units 200 send data on an order for a lens such as a spectacles lens via the network 110 to the server unit 300, the server unit 300 receiving and processing the orders. In the first exemplary embodiment, a lens order system for ordering a spectacles lens is exemplified, but the lens order system is also applicable for ordering another type of lens such as a contact lens. As the network 110, communication line networks such as the Internet based on a general protocol of TCP/IP and the like, an intranet, a LAN (Local Area Network) and a phone line can be exemplified.

Architecture of Terminal Unit

The terminal unit 200 is provided in a shop such as a spectacles lens shop and connected via the network 110 with the server unit 300. In the first exemplary embodiment, the terminal unit 200 is a personal computer, but the terminal unit 200 is not limited thereto. The terminal unit 200 may be any device such as a portable phone, a TV device and a video device as long as the device can communicate via the network 110. As shown in FIG. 2, the terminal unit 200 includes a communicating section 210 as a terminal communicator, an input section 220, a display section 230 as a display, a storage 240, a memory 250, a processor 260 and the like.

The communicating section 210 is connected via the network 110 with the server unit 300 such that data can be transmitted therebetween. The communicating section 210 is connected with the processor 260 such that the communicating section 210 can transmit information via the network 110 with the server unit 300 under the control of the processor 260. The communicating section 210 outputs data acquired via the network 110 from the server unit 300 to the processor 260.

The input section 220 is a keyboard, a mouse and the like, the input section 220 having operation buttons or operation knobs (not shown) for an input operation. The input operation on the operation buttons or the operation knobs includes operation setting of the terminal unit 200, setting of the information to be stored in the terminal unit 200 and setting of lens movement on a later-described simulation motion picture. In accordance with the input operation for a setting, the input section 220 outputs a signal corresponding to the setting to the processor 260 such that the setting is input. The input operation is not limited to an operation with the operation buttons or the operation knobs. The setting may be input by an operation on a touch panel provided on the display section 230 or by a voice input.

Under the control of the processor 260, the display section 230 displays a signal of image information input from the processor 260 on a display area (not shown). The image information includes: information acquired from the server unit 300; information stored in the storage 240; TV image information received by a TV receiver (not shown); and image information stored in a recording medium as an external device such as an optical disc, a magnetic disc or a memory card and read by a drive or a driver. The display section 230 may be a liquid crystal panel, an organic EL (Electro Luminescence) panel, a PDP (Plasma Display Panel), a CRT (Cathode-Ray Tube), an FED (Field Emission Display), an electrophoretic display panel or the like.

The storage 240 readably stores a client data table 400 (FIG. 3), a simulation motion picture table 420 (FIG. 4), server connection data and the like. The storage 240 includes a client data storage area (not shown) for storing the client data table 400, a motion picture storage area (not shown) for storing the simulation motion picture table 420, a connection destination storage area for storing the server connection data is stored and the like. Note that the storage 240 herein includes the above-described three storage areas, but the architecture is not limited thereto. The storage 240 may have no storage area or may have an additional storage area to the above-described storage areas. The storage 240 may be a drive or a driver that readably stores data in a recording medium such as a HD (Hard Disk), a DVD (Digital Versatile Disc), an optical disc and a memory card.

The client data table 400 is a data table relating to an order of a lens from a client, a prescription for the lens and the like.

As shown in FIG. 3, the client data table 400 is table-structured by plural pieces of client data 410, each structured by client ID data 411, prescription data 412, lens design data 413 (lens form design data), usage purpose data 414 (lens usage purpose data), unique additional data 415 and the like which are mutually associated in the client data 410. The prescription data 412, the lens design data 413, the usage purpose data 414 and the unique additional data 415 structure lens design detail data. The client ID data 411, the prescription data 412, the lens design data 413, the usage purpose data 414 and the unique additional data 415 are data-structured in a text format.

The client ID data 411 is unique information for identifying the client data 410, the client ID data 411 being set for each client data 410. The client data 410 may be a client number set for each client, client personal information such as a client name and the like.

The prescription data 412 is data on the vision or a lens prescription for the client of the client data 410 identified by the client ID data 411. The prescription data 412 includes vision data on the vision of the client, lens prescription data on a prescription for the lens to be designed and the like.

The vision data includes data on the vision of the client such as the visual acuity of his naked eyes and the presence of astigmatism. The lens prescription data includes data on a spherical power, an astigmatic power, an astigmatic axis, an addition power, a prismatic degree, an inset amount for near vision, an aspheric correction and the like of a lens.

The lens design data 413 is data on a form of a lens. As the lens design data 413, data on a lens shape model, a size of the lens model and a frame form of a spectacles lens and the like are stored.

The usage purpose data 414 is data on a purpose for which the lens is used. The usage purpose data 414 includes usage situation data on a situation where the lens is used, usage distance data on a distance from a lens user to a to-be-seen object and the like. A usage situations is stored as usage situation data, which includes deskwork, using a personal computer, housework, playing golf, fishing, driving, reading, writing, sewing and the like. The usage distance data is a near distance use when the distance from the lens to the object is equal to or longer than 50 cm, a middle-near distance use when the distance is equal to or shorter than 3 m, a middle distance use when the distance is between 1 to 5 m and a long distance use when the distance is equal to or longer than 5 m, where at least one of these categories in accordance with the distance of the usage purpose by the client and stored as the usage distance data.

The usage purpose data 414 is not limited to the above architecture. For example, data on a hobby or an occupation of the client or numeric data specifically showing a distance from the lens to the to-be-seen object may be stored as the usage distance data, or the usage purpose data 414 may only include either one of the usage situation data and the usage distance data.

The unique additional data 415 includes unique data of a client who uses the lens such as data on motions of the eyeballs or the head of the client, data on convergence force and the like. When the unique additional data 415 is not set, the numeral "0" indicating that no setting has been input may be stored as an initial value.

Order data 416 is data on a lens order status. The order data 416 is structured by order flag data 417, order date data 418, past order data 419 and the like associated as one piece of data.

The order flag data 417 is flag data indicating whether or not the client has ordered a lens. When the client has ordered a lens, for example, "1" indicating that the lens has been ordered is stored. When the client has not ordered a lens, for example, "0" indicating that no lens has been ordered is stored.

The order date data 418 is data on a lens ordered date when the data indicating that the lens has been ordered (e.g. "1") is stored in the order flag data 417. Note that when "0" indicating that no lens has been ordered is stored in the order flag data 417, no data may not be stored in the order date data 418.

The past order data 419 is data on an order history of the client identified by the client ID data 411. The past order data 419 may be associated with, as well as the lens order date in the past, the prescription data 412, the lens design data 413, the usage purpose data 414 and the unique additional data 415 of the lens ordered in the past, and the like. In addition, design data (detailed design lens data of the lens manufactured based on the above-described data in the past) may be stored.

The simulation motion picture table 420 includes plural pieces of simulation motion picture data 430 showing in a motion picture the lens user's vision through the designed lens. The simulation motion picture data 430 is structured by motion picture ID data 431 and motion picture data 432 associated as one piece of data.

The motion picture ID data 431 is unique information for identifying the simulation motion picture data 430, the motion picture ID data 431 being set for each simulation motion picture data 430. The motion picture ID data 431 includes data such as an ID number for identifying the simulation motion picture data 430, which is associated with the client ID data 411. Accordingly, it is possible to easily recognize which motion picture data 432 of the simulation motion picture data 430 corresponds to which lens ordered by the client.

The motion picture data 432 includes a motion picture showing the actual vision of the lens user through the lens designed based on the prescription data 412, the lens design data 413, the usage purpose data 414 and the unique additional data 415 of the client data 410 identified by the client ID data 411 that is associated with the motion picture ID data 431.

Server destination data (not shown) stored in the connection destination storage area of the storage 240 includes information on the server unit 300 that transmits data via the network 110. The server destination data is structured by, for example, server name data, address data, server user data, password data and the like associated as one piece of data. The sever name data is data on a name of the server unit 300 that is a connection destination. The address data is data on an IP address, a domain or the like of the server unit 300. The server user data is, for example, ID data that is stored in the server unit 300 and used for transmitting data with the server unit 300, the ID data being set for each terminal unit 200, a shop or the like. The password data is data on a password for the server user data for preventing a false use by a third party.

The memory 250 readably stores setting details input by the input section 220, audio information, image information and the like. The memory 250 also stores programs running on an OS (Operating System) operating the whole terminal unit 200. The memory 250 may include a drive or a driver that readably stores data in a recording medium such as a HD, a DVD, an optical disc and the like in a readable manner.

The processor 260 includes input/output ports (not shown) such as a communication port connected with the communicating section 210, a key input port connected with the input section 220, a display port connected with the display section 230, a storage port connected with the storage 240, a memory port connected with the memory 250 and the like. As shown in FIG. 5, the processor 260 includes as programs a data acquiring section 261, a request data generator 262 also functioning as an order section, a data transmitter 263, a display controller 266 and the like.

The data acquiring section 261 recognizes an input signal generated by an input operation made by the user on the input section 220, the data acquiring section 261 also recognizing setting detail data based on the input signal. The setting detail data includes a client data setting request data for setting the client data 410, a reproduction request data for reproducing the simulation motion picture data 430, lens movement request data for moving lens image data of the simulation motion picture data, transmission request data for transmitting data from the server unit 300 and other setting data.

Based on the client data setting request data recognized by the data acquiring section 261, the request data generator 262 sets the client ID data 411, the prescription data 412, the lens design data 413, the usage purpose data 414, the unique additional data 415 and the order data 416 to generate the client data 410.

Specifically, when the client data 410 is created for a new client, the request data generator 262 creates new client ID data 411 different from the client ID data 411 of the client data 410 of the existing clients and sets the prescription data 412, the lens design data 413, the usage purpose data 414 and the unique additional data 415, in which the data 412 to 415 are associated with each other.

On the other hand, when there is the client ID data 411 that identifies the existing client (e.g. when the client has used the lens order system 100), the request data generator 262 recognizes the client data 410 identified by the client ID data 411 and the past order data 419 of the client data 410. Based on the past order data 419, the request data generator 262 recognizes the prescription data 412, the lens design data 413, the usage purpose data 414 and the unique additional data 415 of the lens ordered last time and sets data to be changed based on the client data setting request data set by an input on the data acquiring section 261. Although the request data generator 262 exemplarily recognizes the past order data 419, the request data generator 262 may be adapted to re-set the prescription data 412, the lens design data 413, the usage purpose data 414 and the unique additional data 415.

When order request data for ordering a lens is included in the client data setting request data recognized by the data acquiring section 261, the request data generator 262 stores, for example, "1" in the order flag data 417 of the order data 416 of the client data 410 and data on the date when the client data setting request data is input in the order date data 418. On the other hand, when the request data generator 262 recognizes that motion picture creation data for requesting a creation of the simulation motion picture data is stored in the client data setting request data recognized by the data acquiring section 261, the request data generator 262 stores, for example, "0" in the order flag data 417.

When the data acquiring section 261 recognizes transmission request data, the data transmitter 263 transmits data via the communicating section 210 with the server unit 300.

Specifically, when the data acquiring section 261 recognizes the transmission request data for requesting that the client data 410 identified by a predetermined client ID data 411 be sent, the data transmitter 263 controls the communicating section 210 to send the client data 410 of the client ID data 411 to the server unit 300. At the same time, based on the server destination data stored in the storage 240, the data transmitter 263 is operated such that the client data 410 is sent to a predetermined server unit 300. The data transmitter 263 sends the server unit 300 the client data 410 and data identifying the terminal unit 200 (e.g. the server user data and the password data of the server destination data) which are associated with the client data 410.

The data transmitter 263 controls the communicating section 210 to acquire scene object data 480 (below-described object image data) and lens object data 490 (lens image data) which are sent from the server unit 300. The data transmitter 263 readably stores the acquired scene object data 480 and lens object data 490 in the memory 250.

The lens design section 264 designs a lens based on the object request data 450. Specifically, the lens design section 264 recognizes the prescription data 412, the lens design data 413, the usage purpose data 414 and the unique additional data 415 of the client data 410.

The lens design section 264 designs the form of the lens based on the lens design data 413.

The lens design section 264 determines the distance characteristics of the lens based on the usage purpose data 414. Specifically, the lens design section 264 sets a ratio of areas of the lens for seeing a far-distanced, middle-distanced and near-distanced object. For example, when data indicating that the lens object is located at far to middle distance is stored (e.g. when playing golf, bird watching and the like are stored in the usage situation data or when data indicating that the lens is used in a distance of 8 m and more is stored in the usage distance data), the lens design section 264 sets the distance characteristics such that the areas for seeing the far-distanced and middle-distanced object are large and the area for seeing the near-distanced object is small. On the other hand, when data indicating that the lens object is middle to near distanced is stored (e.g. when driving is stored in the usage situation data or when data indicating that the lens is used in a distance of 7 m or less is stored in the usage distance data), the lens design section 264 sets the distance characteristics such that the area for seeing the far-distanced object is small and the areas for seeing the middle-distanced and near-distanced object are large.

Subsequently, based on the prescription data 412 and the unique additional data 415, the lens design section 264 appropriately sets the thickness and weight of the lens and the curvature of the lens surface for each area for seeing the far, middle and near distanced objects.

The lens design section 264 readably stores the designed ratio of the areas, the thickness and weight of the lens, the curvature of the lens surface, the form of the lens and the like in the memory 250 or in the storage 240 as design lens data. When storing, the lens design section 264 associates the client ID data 411 of the client data 410 with the design lens data. In the first exemplary embodiment, the design lens data is initially created and then stored in a memory 350 in a readable manner, but the architecture is not limited thereto. For example, the design lens data may be initially added to the client data 410 and then stored in the client data table 400.

The simulation motion picture generator 265 generates the simulation motion picture data 430 based on the client data 410.

Specifically, the simulation motion picture generator 265 reads the scene object data 480 received by the data transmitter 263 and stored in the memory 250 and generates a composition image (processed image data) in which the scene object data 480 is combined. Although details will be described later, the scene object data 480 includes scene object image data 483 in which an image of the to-be-seen object is stored and distance data 482 having data on a distance from the lens to the object position. In addition, for example, the simulation motion picture generator 265 generates a composition image in which the scene object image data 483 with far-distance scene object data 480 is disposed on an upper side of the composition image and the scene object image data 483 is disposed downward in the composition image as the distance data 482 approaches to a near distance.

Subsequently, the simulation motion picture generator 265 processes the image based on the prescription data 412 and the unique additional data 415 to show the lens user's vision of this composition image with naked eyes. For example, the simulation motion picture generator 265 image-processes the scene object image data 483 of the composition image based on the vision data of the prescription data 412 and the unique additional data 415 to display the image in a corresponding manner to the vision of the lens user with naked eyes, the astigmatic power, a heterophoria, an amplitude of convergence, where, for instance, the contour of the image is blurred, the contour is multiplied, the color runs and the scene object image data 483 is distorted. Herein, the simulation motion picture generator 265 image-processes each of the scene object image data 483 corresponding to each distance based on the distance data 482 of the distance data 482 to show the vision of the lens user of the object of the scene object image data 483 located at a position apart by a distance of the distance data 482. Accordingly, as shown in FIGS. 6 to 8, the scene object image data 483 disposed on the composition image is image-processed to a state in accordance with the vision of the lens user corresponding to each distance such that the far distance image data 520, the middle distance image data 530 and the near distance image data 540 are image-edited as shown in FIGS. 6 to 8.

Next, the simulation motion picture generator 265 reads the lens object data 490 received and processed by the data transmitter 263 and stored in the memory 250. As shown in FIGS. 6 to 8, the simulation motion picture generator 265 superposes the lens image data 493 of the read lens object data 490 on the composition image.

Based on the design lens data generated by the lens design section 264, the simulation motion picture generator 265 image-processes the superposing portion 510 of the lens image data 493 and the composition image to show the lens user's vision of the object through the lens designed by the lens design section 264. Based on the distance data 482 of the scene object data 480, the simulation motion picture generator 265 image-processes the superposing portion 510 between the lens image data 493 and the image data 520, 530, 540 corresponding to the distances to show the lens user's vision through the lens an object located at a position apart by the distance based on the distance data 482.

Further, the simulation motion picture generator 265 generates the motion picture data 432 in which the lens image data 493 is moved on a composition image. Herein, in accordance with the movement of the lens image data 493, the superposing portion 510 with the composition image is sequentially image-processed to generate a composition motion picture in which the image data 520, 530, 540 out of the superposing portion 510 is restored to show the lens user's vision with naked eyes the object located at a position apart by the distance based on the distance data 482. Based on the design lens data, the prescription data 453 and unique additional data 456, the simulation motion picture generator computes distortion of the image data generated by the movement of the lens image data 493 to reflect the distortion on the superposing portion 510.

At this time, the simulation motion picture generator 265 recognizes the lens movement request data acquired by the data acquiring section 261 and conducts the processing for moving the lens based on the lens movement request data. As stated above, the lens movement request data is data input by an input signal generated by an input operation made on the input section 220 by the user, the lens movement request data including request data on a movement direction and a movement speed of the lens. Further, based on the lens movement request data, the simulation motion picture generator 265 generates the motion picture data 432 in which the lens image data 493 is moved in a predetermined direction at a predetermined speed and acceleration.

The simulation motion picture generator 265 associates the generated motion picture data 432 with the motion picture ID data 431 generated based on the client ID data 411 to be readably stored as the simulation motion picture data 430 in the simulation motion picture table 420.

Now, the simulation motion picture displayed on the display area of the display section 230 will be described. The simulation motion picture simulates the actual vision of the lens user of a scene, a person, an object and the like observed through the lens designed based on the data stored in the client data 410. In the first exemplary embodiment, FIGS. 6 to 8 respectively exemplify a far-middle lens simulation motion picture 500A for a middle to far distance between the lens and the to-be-seen object, a middle-near lens simulation motion picture 500B for a near to middle distance between the lens and the to-be-seen object and a far-near lens simulation motion picture 500C for a near to far distance between the lens and the to-be-seen object. However, the architecture is not limited thereto. More simulation motion pictures corresponding to actual distances from the lens to the to-be-seen object may be used.

As shown in FIG. 6, in the far-middle lens simulation motion picture 500A, far distance image data 520 and middle distance image data 530 are combined to form composition image data on which lens image data 493 is superposed and moved. As shown in FIG. 7, in the middle-near lens simulation motion picture 500B, the lens image data 493 is superposed and moved on composition image data combining the middle distance image data 530 and near distance image data 540. As shown in FIG. 8, in the far-near lens simulation motion picture 500C, the lens image data 493 is superposed and moved on composition image data combining the far distance image data 520, the middle distance image data 530 and the near distance image data 540.

In each simulation motion picture 500A, 500B, 500C, the lens image data 493 shows a lens form corresponding to the lens design data 413 of the client data 410. The far distance image data 520 shows an object at a long distance from the lens (e.g. 50 m or more). The middle distance image data 530 shows an object at a middle distance from the lens (e.g. 5 m to 50 m). The near distance image data 540 shows an object at a short distance from the lens (e.g. 5 m or less).

Based on the prescription data 412 and the unique additional data 415 of the client data 410, the far distance image data 520, the middle distance image data 530 and the near distance image data 540 are each image-processed to show the actual vision of a client when the client sees each image without wearing the lens from a predetermined distance. The superposing portions 510 of the lens image data 493 and the far distance image data 520, the middle distance image data 530 and the near distance image data 540 are each image-processed to show the actual vision of the client when the client sees the far distance image data 520, the middle distance image data 530 and the near distance image data 540 with the lens designed based on the prescription data 412, the lens design data 413, the usage purpose data 414, the unique additional data 415 and the like.

When the data acquiring section 261 recognizes the client data setting request data is recognized by the data acquiring section 261 in accordance with, e.g., a setting input on the input section 220, the display controller 266 displays a setting screen for prompting a setting input of the client data 410 on the display section 230. When the data acquiring section 261 recognizes reproduction request data, the display controller 266 reproduces the simulation motion picture data to be displayed on the display section 230. The display controller 266 also displays another screen on the display section 230 based on a setting input on the input section 220.

Architecture of Server Unit

As described above, the server unit 300 is provided in a communicable manner with the terminal unit 200 via the network 110. The server unit 300 is provided in a premise of a manufacturer of a lens such as a spectacles lens. The server unit 300 receives order data of a spectacles lens ordered from the terminal unit 200 and processes the received order. Based on data input from each terminal unit 200, the server unit 300 recognizes and sends to the terminal unit 200 the scene object data 480 and the lens object data 490 which form the simulation motion picture data 430 generated on the terminal unit 200. As shown in FIG. 9, the server unit 300 includes an interface 310 as a server communicator, an operation section 320, an output section 330, a storage 340, the memory 350 and a server processor 360.

The interface 310 is connected via the network 110 with the terminal unit 200. The interface 310 is electrically connected with the server processor 360. The interface 310 performs a predetermined input interface processing for a server signal input via the network 110 and outputs a processing server signal to the server processor 360. When the processing server signal to be sent from the server processor 360 to the terminal unit 200 is input to the interface 310, the interface 310 performs a predetermined output interface processing for the input processing server signal and outputs a server signal via the network 110 to the terminal unit 200.

Similarly to the input section 220 of the terminal unit 200, the operation section 320 is a keyboard or a mouse for example, the input section 220 having operation buttons or operation knobs (not shown) for an input operation. The input operation made on the operation buttons or the operation knobs includes operation setting of the server unit 300, setting of the information to be stored in the storage 340 and update setting of the information stored in the storage 340. In accordance with the input operation for a setting, the operation section 320 outputs a signal corresponding to the setting to the server processor 360 such that the setting is input. The input operation is not limited to an operation on the operation buttons or the operation knobs. The setting may be input by an operation on a touch panel provided on the display of the output section 330 or a voice input.

The output section 330 includes the display that is controlled by the server processor 360 and displays a signal of image data from the server processor 360. Similarly to the display section 230 of the terminal unit 200, the display may be a liquid crystal panel, an organic EL panel, a PDP, a CRT, an FED and an electrophoretic display panel. Although the display is used as the output section 330, a printer that outputs predetermined data print-out, an audio outputting section that outputs data with sound or the like may be alternatively employed.

The storage 340 includes an object request storage area for storing the object request table 440 relating to a request for sending the scene object data 480 and the lens object data 490, an order reception storage area for storing order reception table 460 relating to an order reception, a scene object storage area for storing a scene object table 480A, a lens object storage area for storing a lens object table 490A and the like. The storage 340 may be a drive or a driver that readably stores data in a recording medium such as a HD, a DVD, an optical disc, a memory card and the like.

The object request table 440 stored in the storage 340 is a data table relating to a request for sending the object data sent from the terminal unit 200. As shown in FIG. 10, the object request table 440 is table-structured by plural pieces of object request data 450, each having request ID data 451, reception date data 452, prescription data 453, lens design data 454 (lens form design data), usage purpose data 455 (lens usage purpose data) and the like associated as one piece of data. The object request data 450 is generated based on the client data 410 sent from the terminal unit 200, of which prescription data 453, lens design data 454 and usage purpose data 455 store substantially the same data as the prescription data 412 of, the lens design data 413, the usage purpose data 414 and the unique additional data 415 of the client data 410.

The request ID data 451 is unique data for identifying the object request data 450, which is associated with the client ID data 411. Specifically, the request ID data 451 stores, for example, the client ID data 411 of the client data 410, the server user data of the terminal unit 200 (a sender) and the like.

The reception date data 452 is data on a date when the object request data 450 identified by the request ID data 451 is created. Specifically, the reception date data 452 stores a date when the server unit 300 receives, for example, the client data 410 as a creation basis.

The order reception table 460 is a data table relating to a receipt of a lens order sent from the terminal unit 200. As shown in FIG. 11, the order reception table 460 is table-structured by plural pieces of order reception data 470, each having order reception ID data 471, order reception date data 472, prescription data 473, lens design data 474 as lens form design data, usage purpose data 475 as lens usage purpose data, unique additional data and the like associated as one piece of data. Similarly to the object request data 450, the order reception data 470 is generated based on the client data 410 sent from the terminal unit 200, of which prescription data 473, lens design data 474, usage purpose data 475 and unique additional data 476 store substantially the same data as the prescription data 412, the lens design data 413, the usage purpose data 414 and the unique additional data 415 of the client data 410.

The order reception ID data 471 is unique data for identifying the order reception data 470 and is associated with the client ID data 411. Specifically, the order reception ID data 471 includes, for example, the client ID data 411 of the client data 410, the server user data of the terminal unit 200 (a sender) and the like.

The order reception date data 472 is data on a date when the order reception data 470 identified by the order reception ID data 471 is generated. Specifically, the order reception date data 472 includes a date when the server unit 300 receives, for example, the client data 410 as a creation basis.

A scene object table 480A is a data table relating to image data such as the far distance image data 520, the middle distance image data 530 and the near distance image data 540 which form the motion picture data 432 of the simulation motion picture data 430 as described above. As shown in FIG. 12, the scene object table 480A is table-structured by plural pieces of scene object data 480, each having scene object ID data 481, distance data 482, scene object image data 483 as image data and the like associated as one piece of data.

The scene object ID data 481 is unique data for identifying the scene object data 480 and is set for each scene object data 480.

The distance data 482 is data on a distance from the lens to the image data (the to-be-seen object) of the scene object data 480 identified by the scene object ID data 481. Specifically, the distance data 482 includes data on a distance from the lens to the to-be-seen object. Note that the distance data 482 may be classified data such as, for instance, far distance, middle distance and near distance in which the distance from the lens to the to-be-seen object is classified based on a predetermined distance is stored. Alternatively, values representing the distance from the lens to the to-be-seen object may be stored as the distance data 482.

The scene object image data 483 stores image of the to-be-seen object corresponding to the image data 520, 530, 540 forming the motion picture data 432 of the simulation motion picture data 430.

Although in the scene object data 480 the scene object image data 483 is exemplarily associated with the scene object ID data 481 and the distance data 482, the scene object image data 483 may be additionally associated with situation data including several kinds of images of the scene object image data 483 or data such as an image of golf course or deskwork in the data structure.

The lens object table 490A is a data table storing the lens image data 493 forming the above-described simulation motion picture data 430. As shown in FIG. 13, the lens object table 490A is table-structured by plural pieces of lens object data 490, each having lens object ID data 491, lens form data 492, the lens image data 493 and the like associated as one piece of data.

The lens object ID data 491 is unique data for identifying the lens object data 490 is set for each lens object data 490.

The lens form data 492 is data on a form of a lens. The lens form data 492 includes data on the refractive index or the Abbe number of a lens material, coordinate value data of refracting surfaces of a lens (anterior and posterior surfaces), thickness data such as a center thickness of the lens, a lens shape model, a size of the lens shape model, a frame form of a spectacles lens and the like. Additionally, data on refracting on points on the lens (such as a refractive index, a prism effect and the like) may be included.

The lens image data 493 includes the lens image data 493 forming the motion picture data 432 of the simulation motion picture data 430.

The memory 350 readably stores settings, audio information, image information and the like which are input with the operation section 320. The memory 350 also stores programs running on an OS (Operating System) operating the whole server unit 300. The memory 350 may include a drive or a driver that readably stores data in a recording medium such as a HD, a DVD, an optical disc and the like in a readable manner.

As shown in FIG. 14, the server processor 360 includes, as programs stored in the memory 350, a request data recognizer 361 also functioning as a data recognizer and an order reception section, an object selecting section 362 (an image recognizer), an order reception output section 363 and the like.

The request data recognizer 361 controls the interface 310, receives data (e.g. the client data 410) sent from the terminal unit 200 and recognizes the received data. When recognizing the client data 410 sent from the terminal unit 200, the request data recognizer 361 recognizes the order flag data 417 of the order data 416 of the client data 410.

When recognizing that data (e.g. "0") indicating no lens is ordered is stored in the order flag data 417, the request data recognizer 361 generates the object request data 450 based on the received client data 410 and readably stores the generated object request data 450 in the object request table 440 in the storage 340. At this time, the request data recognizer 361 stores the object request data 450 in the object request table 440 in an ascending order of the reception date data 452.

On the other hand, when recognizing that data (e.g. "1") indicating a lens is ordered is stored in the order flag data 417, the request data recognizer 361 generates the order reception data 470 based on the received client data 410 and readably stores the generated order reception data 470 in the order reception table 460 in the storage 340. At this time, the request data recognizer 361 stores the order reception data 470 in the order reception table 460 in an ascending order of the order reception date data 472.

The object selecting section 362 selects the scene object data 480 and the lens object data 490 based on the object request data 450.

Specifically, the object selecting section 362 recognizes the usage purpose data 455 of the object request data 450 and selects a predetermined number of pieces of scene object data 480 having the distance data 482 of which distance property is the same as that stored in the usage purpose data 455. For example, when data indicating that the lens object is located at far to middle distance is stored in the usage purpose data 455, a predetermined number of pieces of scene object data 480 of which distance data 482 is far or middle distance are selected. Note that the object selecting section 362 may select one piece of scene object data 480 for each distance. When a larger number than the predetermined number of scene object data 480 exist, a predetermined number of pieces of scene object data 480 with similar usage situations are selected based on the usage situation data of the usage purpose data 455. For example, when the usage situation data indicates car-driving, the scene object data 480 of which scene object image data 483 is an image in driving a car may be selected by the predetermined number. Further, that when a specific lens distance is stored in the distance data 482, the object selecting section 362 may select the distance data 482 having the nearest distance data 482 to the distance stored in the usage distance data of the usage purpose data 455.

The object selecting section 362 selects the lens object data 490 from the lens object table 490A based on the lens design data 454. At this time, the object selecting section 362 selects the lens object data 490 having the lens form data 492 corresponding to the lens form, the lens size and the frame form stored in the lens design data 454.

The object selecting section 362 controls the interface 310 to send the selected scene object data 480 and lens object data 490 to the terminal unit 200. Herein, based on the server user data sent from the terminal unit 200, the object selecting section 362 sends the scene object data 480 and the lens object data 490 to the terminal unit 200 identified by the server user data.

When the order reception data output section 363 recognizes a request signal for outputting the order reception data 470 based on the operation input signal from the operation section 320 for example, the order reception data output section 363 controls the output section 330 to output the order reception data 470 stored in the order reception table 460. Note that the order reception data output section 363 may conduct a processing for outputting the order reception data 470 from the output section 330 at a predetermined time interval.

Operation of Lens Order System

Figure 15:
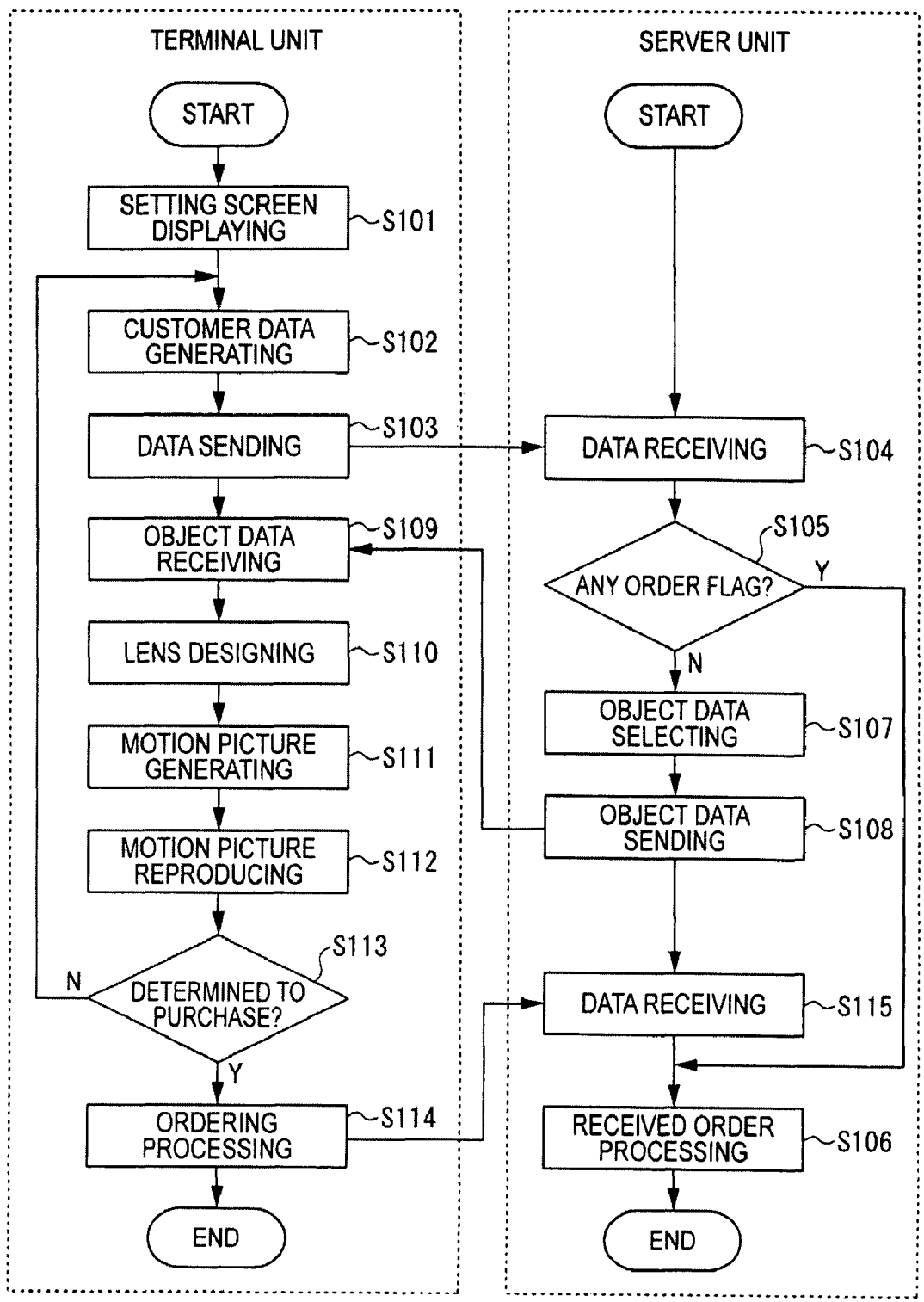
FIG. 15 is a flowchart showing a lens order processing of the lens order system of the first exemplary embodiment.

A lens order processing in the lens order system 100 will be described with reference to FIG. 15. FIG. 15 is a flowchart showing a lens order processing of the lens order system of the first exemplary embodiment.

In FIG. 15, when an input signal for staring a processing relating to a lens order is input by an input operation made on the input section 220 by a user, the terminal unit 200 of the lens order system 100 conducts the lens order processing. Specifically, the display controller 266 of the processor 260 of the terminal unit 200 controls the display section 230 to display an input setting screen (Step S101).

When the user such as a lens user and a sales person inputs data in the data display frame displayed on the input setting screen by operating the input section 220, the data acquiring section 261 of the processor 260 acquires the input data. The request data generator 262 of the processor 260 generates the client data 410 based on the recognized data (Step S102). At this time, when an input signal for ordering a lens is input by the input operation made on the input section 220 by the user, the request data generator 262 stores, for example, "1" in the order flag data 417. On the other hand, when an input signal for requesting a generation of a simulation motion picture without ordering a lens is recognized, the request data generator 262 stores, for example, "0" in the order flag data 417.

Subsequently, the data transmitter 263 of the processor 260 controls the communicating section 210 to send the client data 410 generated in Step S102 to a predetermined server unit 300 based on pre-set server destination data (Step S103). At this time, the data transmitter 263 sends the client data 410 and unique data identifying the terminal unit 200 such as the server user data and password data of the server destination data.

On the other hand, when the server unit 300 receives the client data 410 sent from the terminal unit 200 (Step S104), the request data recognizer 361 of the server unit 300 recognizes the client data 410. The request data recognizer 361 judges whether or not an order flag is contained by referring to the order flag data 417 of the client data 410 (Step S105).

In Step S105, when the request data recognizer 361 judges that data indicating that a lens is ordered (e.g. "1") is stored in the order flag data 417, the request data recognizer 361 generates the order reception data 470 based on the client data 410. Specifically, the request data recognizer 361 generates the order reception ID data 471 based on unique data identifying a terminal such as the client ID data 411 and server user data of the client data 410 and recognizes a date when the client data 410 is received to generate the order reception date data 472. In addition, the request data recognizer 361 generates the prescription data 473, the lens design data 474, the usage purpose data 475 and the unique additional data 476 based on the prescription data 412, lens design data 413, usage purpose data 414 and unique additional data 415 of the client data 410. The request data recognizer 361 associates the generated data with each other to generate and readably store the order reception data 470 in the order reception table 460 of the storage 340 (Step S106). When a setting input signal for outputting the order reception data 470 stored in the order reception table 460 is input by an operation on the operation section 320 of the server unit 300, the order reception data output section 363 of the server processor 360 controls the output section 330 to output the order reception data 470. Specifically, the order reception data output section 363 displays the order reception data 470 on the display area of the display and prints the order reception data by a printing machine such as a printer.

On the other hand, in Step S105, when the request data recognizer 361 judges that data indicating that no lens is ordered (e.g. "0") is stored in the order flag data 417, the request data recognizer 361 generates the object request data 450 based on the client data 410. Specifically, the request data recognizer 361 generates the request ID data 451 based on unique data such as the client ID data 411 and server user data of the client data 410 for identifying a terminal and recognizes a date when the client data 410 is received to generate the reception date data 452. In addition, the request data recognizer 361 generates the prescription data 453, the lens design data 454 and the usage purpose data 455 based on the prescription data 412, the lens design data 413 and the usage purpose data 414 of the client data 410. The request data recognizer 361 associates the generated data with each other to generate and readably stores the object request data 450 in the object request table 440 of the storage 340.

The server processor 360 selects the scene object data 480 and the lens object data 490 based on the object request data 450. In other words, based on the usage purpose data 455, the object selecting section 362 selects a predetermined number of pieces of the scene object data 480 of which distance data 482 corresponds to the lens usage purpose. The object selecting section 362 selects the lens object data 490 having the lens form data 492 corresponding to the lens design data 454 (Step S107).

Subsequently, the object selecting section 362 of the server processor 360 conducts a processing for sending the selected scene object data 480 and lens object data 490 to a predetermined terminal unit 200 based on the unique data identifying the terminal unit 200 such as the server user data sent with the client data 410 in Step S104 (Step S108).

On the other hand, the terminal unit 200 conducts a processing such that the data transmitter 263 receives the scene object data 480 and the lens object data 490 sent from the server unit 300 (Step S109).

Subsequently, the lens design section 264 of the processor 260 of the terminal unit 200 designs a lens based on the client data 410 generated in Step S102 (Step S110). In other words, the lens design section 264 designs the form of the lens based on the lens design data 413. The lens design section 264 sets a ratio of areas of the lens for seeing a far-distanced, middle-distanced and near-distanced object of the lens based on the usage purpose data 414. Additionally, based on the prescription data 412 and the unique additional data 415, the lens design section 264 sets the thickness and weight of the lens and the curvature of the lens surface for each area for seeing the far, middle and near-distanced object.

The lens design section 264 readably stores the designed ratio of the areas, the thickness and weight of the lens, the curvature of the lens surface, the form of the lens and the like in the memory 250 or in the storage 240 as design lens data.

When a first reproduction button for reproducing a motion picture of the input setting screen displayed in Step S201 is selected by, e.g., operating the input section 220 and a request signal for requesting a reproduction of the simulation motion picture data 430 is accordingly input, the simulation motion picture generator 265 of the processor 260 generates the simulation motion picture data 430 based on the client data 410, the design lens data generated in Step S110 and the object data received in Step S109 (Step S111).

Specifically, the simulation motion picture generator 265 generates a composition image in which the scene object image data 483 of the scene object data 480 received in Step S109 is combined, the simulation motion picture generator 265 image-processing, based on the prescription data 412 and the unique additional data 415, the composition image to show a lens user's vision with naked eyes of an object of the composition image disposed at a distance of the distance dimension of the distance data 482.

The simulation motion picture generator 265 superposes the lens image data 493 of the lens object data 490 received in Step S109 on the created composition image.

Based on the design lens data generated in Step S110, the simulation motion picture generator 265 image-processes the superposing portion 510 of the lens image data 493 and the image data 520, 530, 540 structured by each scene object data 480 of the composition image to show the lens user's vision of an object at the distance of the distance data 482 through the lens.

The simulation motion picture generator 265 generates, based on the lens movement request data acquired by the data acquiring section 261, an image in which the lens image data 493 is moved on the composition image in a predetermined direction at a predetermined speed and acceleration and sequentially image-processes the superposing portion 510 in accordance with the movement of the lens image data 493 to generate the motion picture data 432 in which the image data 520, 530, 540 out of the superposing portion 510 is restored to show the lens user's vision with naked eyes of an object located at a position apart by a distance of the distance data 482. At this time, the simulation motion picture generator 265 computes distortion of the image data caused by the movement of the lens image data 493 based on the design lens data, the prescription data 453 and the unique additional data 456 to reflect the distortion on the superposing portion 510.

The simulation motion picture generator 265 readably stores in the simulation motion picture table 420 the simulation motion picture data 430 in which the generated motion picture data 432 is associated with the motion picture ID data 431.

The display controller 266 of the processor 260 controls the display section 230 to display the motion picture data 432 generated in Step S111 on the display area in real time as shown in FIGS. 6 to 8 (Step S112).

As described above, the motion picture data 432 shows the lens user's vision of an object with his naked eyes and with the ordered lens based on the vision data of the lens user, the lens user can judge whether or not the ordered lens meets his demands by checking the motion picture data 432.

Subsequent to the check on the motion picture data 432, the data acquiring section 261 of the processor 260 judges whether or not the order flag data 417 is input by an input operation made on the input section 220 by the user (Step S113).

In Step S113, when the order button relating to an lens order on the input setting screen is not selected by an input operation made on the input section 220 by the user but an operation for editing the data in the data display frame is conducted, the processing returns to Step S102 where the request data generator 262 of the processor 260 modifies the client data 410.

On the other hand, in Step S113, when the order button relating to an lens order on the input setting screen is selected by an input operation made on the input section 220 by the user to input a setting for ordering a lens, the request data generator 262 generates the client data 410 in which data indicating that a lens is ordered (e.g. "1") is stored in the order flag data (Step S114). The generated client data 410 is sent to the server unit 300 together with the unique data such as the server user data for identifying the terminal unit 200.

When receiving the client data 410 generated in Step S114 (Step S115), the server unit 300 conducts the processing in Step S106. Specifically, the request data recognizer 361 of the server processor 360 generates the order reception data 470 based on the client data 410 and readably stores the order reception data 470 in the order reception table 460. When the input signal for outputting, the order reception data 470 is input, the output section 330 is controlled to output the order reception data 470.

Subsequent to Step S106, the server unit 300 ends the lens order processing. Alternatively, the server unit 300 is set on standby, where the server unit 300 waits for receiving the client data 410 from the terminal unit 200.

On the other hand, the terminal unit 200 ends the lens order processing subsequent to Step S114.

Effects and Advantages of Lens Order System

As described above, in the lens order system 100 of the first exemplary embodiment: the data acquiring section 261 of the processor 260 of the terminal unit 200 connected via the network 110 with the server unit 300 recognizes various kinds of data input from the input section 220; the request data generator 262 generates the client data 410; and the generated client data 410 is sent to the server unit 300. The server unit 300 recognizes the received client data 410; and when data indicating that no lens is ordered is stored in the order flag data 417 of the client data 410, the server unit 300 generates the object request data 450 based on the client data 410. Based on the object request data 450, the object selecting section 362 of the server unit 300 selects and sends to the terminal unit 200 the scene object data 480 and the lens object data 490. Based on the client data 410, the lens design section 264 of the terminal unit 200 designs the lens and generates the design lens data. The simulation motion picture generator 265 of the terminal unit 200 superposes the lens image data 493 on a predetermined composition image and moves the lens image data 493 thereon based on the client data 410, the design lens data, the scene object data and the lens object data, the simulation motion picture generator 265 generating the motion picture data 432 in which the superposing portion 510 of the lens image data 493 and the composition image is image-processed to show the lens user's vision of the composition image data through the lens. The display controller 266 of the terminal unit 200 controls the display section 230 and conducts a processing for reproducing the motion picture data 432.

Further, when the request data generator 262 of the terminal unit 200 recognizes an input signal for ordering a lens, the request data generator 262 generates the client data 410 in which information for ordering a lens is stored in the order flag data 417 and sends the generated client to the server unit 300. In the server unit 300, when the request data recognizer 361 recognizes that information for ordering a lens is stored in the order flag data 417 of the client data 410, the request data recognizer 361 generates the order reception data 470 based on the client data 410.

Accordingly, with the simulation motion picture data 430, the lens user can check the vision through the lens that he is going to order before ordering. Hence, inconvenience such as a mismatch between the lens desired by the lens user and the actually manufactured lens can be avoided, so that the lens that the lens user truly desires can be securely ordered.

Since the simulation motion picture generator 265 of the terminal unit 200 generates the motion picture data 432 using the scene object data sent from the server unit 300, it is not necessary to store the scene object data 480 in the storage 240 of the terminal unit 200, so that the storage area of the storage 240 can be secured. Since a processing for searching the scene object data 480 stored in the storage 240 and the like are not necessary either, the processing load for simulation motion picture generation processing can be reduced.

Since the data sent from the terminal unit 200 via the network 110 to the server unit 300 is the client data 410 data-structured in a text format and the data sent from the server unit 300 to the terminal unit 200 is image data of the scene object data 480 and the lens object data 490, the data size can be made small and communication load in data transmission can be reduced, thereby speeding up the processing. Accordingly, it is possible to appropriately assist the lens user to select a lens, thereby speeding up the ordering processing of the lens.

The object selecting section 362 of the server unit 300 selects the lens object data 490 having the lens form data 492 corresponding to a lens form stored in the lens design data 454 and sends the selected lens object data 490 to the terminal unit 200. Accordingly, the simulation motion picture generator 265 only needs to superpose the lens image data 493 of the lens object data 490 recognized by the object selecting section 362 on the composition image data, thereby facilitating the generation of the motion picture data 432. Similarly to the scene object data 480, since the lens object data 490 is stored in the storage 340 of the server unit 300, it is not necessary to store the lens object data 490 in the terminal unit 200, thereby preventing the storage area of the storage 240 of the terminal unit 200 from being occupied. Additionally, a searching for the lens form data 492 in the terminal unit 200 is not necessary, so that processing load for the simulation motion picture generating processing on the terminal unit 200 can be reduced. Further, since the user selects a lens having a form of desire, the user can judge the lens form is suitable before a production of the lens by checking the generated motion picture data 432.

The lens design section 264 of the processor 260 designs the lens based on the lens prescription data stored in the prescription data 412 of the client data 410. Hence, the lens design section 264 can design a lens that matches the lens prescription desired by the lens user. Accordingly, the lens can be set exactly how the lens user desires.

The simulation motion picture generator 265 image-processes the superposing portion 510 based on the design lens data. Accordingly, owing to the simulation motion picture data 430 reproduced on the terminal unit 200, the lens user can easily check the vision through the lens of his lens prescription data. Hence, since the lens user can easily check the desired lens before manufacturing the lens, it is possible to manufacture the lens desired by the lens user.

Based on the vision data of the prescription data 412 of the client data 410, the simulation motion picture generator 265 creates the motion picture data 432 in which the lens image data 493 is superposed on the composition image corresponding to the vision of the lens user with naked eyes.

Accordingly, by reproducing the motion picture data 432, the lens user can check and compare the vision of the to-be-seen object with his naked eyes and the vision with the lens. Hence, it is possible to easily check the performance of the lens or whether or not the lens matches with his preference based on the motion picture data 432, so that the lens truly desired by the lens user can be appropriately ordered.

Herein, based on the distance data 482 of the scene object data 480, the simulation motion picture generator 265 image-processes the scene object image data 483 based on the vision data to show the lens user's vision of the object of the scene object image data 483 disposed at a distance of the distance data 482.

Hence, it is possible to show a difference depending on the distance of the object on the composition image, so that the motion picture data 432 that is closer to the actual vision can be created. By seeing such motion picture data 432, the lens user can easily check the characteristics of the lens, thereby providing appropriate assistance for selecting a lens.

The lens design section 264 designs the lens corresponding to the usage purpose data 414 and generates the design lens data and the object selecting section 362 selects the scene object data 480 having the distance data 482 corresponding to the usage purpose data 455.

Hence, the lens design section 264 can design the lens so as to have the distance characteristics corresponding to the usage purpose of the lens of the lens user. The simulation motion picture generator 265 generates the composition image with which the scene object image data 483 corresponding to the usage purpose of the lens by the lens user is combined, and the lens design section 264 image-processes the superposing portion 510 of the lens image data 493 based on the design lens data set by the lens design section 264. Hence, it is possible to generate the motion picture data 432 corresponding to the lens usage purpose of the lens user in a manner closer to the actual vision, thereby more appropriately assisting lens-selection of the lens user.

The usage purpose data 414 includes the usage distance data on a distance from the lens to the to-be-seen object. Hence, the distance from the lens to the object can be more clearly recognized, so that the lens design section 264 can design the lens that appropriately matches with the lens usage purpose of the lens user. Since the simulation motion picture generator 265 generates the motion picture data 432 in which the image data 520, 530, 540 corresponding to the lens usage purpose is image-processed, the lens user can check the lens condition corresponding to the lens usage purpose by checking the motion picture data 432, thereby enabling a more appropriate selection of a lens.

Further, the simulation motion picture generator 265 generates the motion picture data 432 in which the lens image data 493 is moved on a composition image.

Hence, it is possible to simulate distortion and the like generated by a movement of the lens while the lens user sees the composition image with the lens corresponding to the design lens data. Accordingly, by checking the motion picture data 432, it is possible to more appropriately simulate the usage of the lens, thereby more appropriately assisting the lens user to select and order a lens appropriate for the lens user.

At this time, based on the lens movement request data input by an input setting made by the user on the input section 220, the simulation motion picture generator 265 moves the lens image data 493 in a predetermined direction at a predetermined speed and acceleration. Hence, the user can confirm the vision through the lens by moving the lens image data 493 in real time while watching the simulation motion pictures 500A, 500B, 500C displayed on the display screen. Accordingly, it is possible to provide a more appropriate assistance for the user to order a lens of the lens user's desire.

The simulation motion picture generator 265 readably stores the generated simulation motion picture data 430 in the simulation motion picture table 420. Hence, the motion picture data 432 can be reproduced at many times by reading the simulation motion picture table 420. Accordingly, when a comparison between the motion picture data 432 based on the corrected client data 410 and the motion picture data 432 based on the client data 410 before correction is desired, it is not necessary to re-create the motion picture data 432 before correction but the motion picture data 432 before correction can be easily reproduced only by reading the simulation motion picture data 430 stored in the simulation motion picture table 420. Hence, plural pieces of motion picture data 432 can be reproduced without placing the increased processing load on the terminal unit 200. In addition, by comparing the plural pieces of motion picture data 432 with each other, it is possible to more appropriately assist a lens order of the lens user.

Second Exemplary Embodiment

A lens order system according to a second exemplary embodiment will be described below. The lens order system according to the second exemplary embodiment is arranged by providing a lens design section to the server unit 300 of the first exemplary embodiment. Accordingly, the network structure of the lens order system 100 and data used in the system 100 are the same as the first exemplary embodiment, so that the same reference numerals are also used in the second exemplary embodiment to simplify or omit the description.

Figure 16:
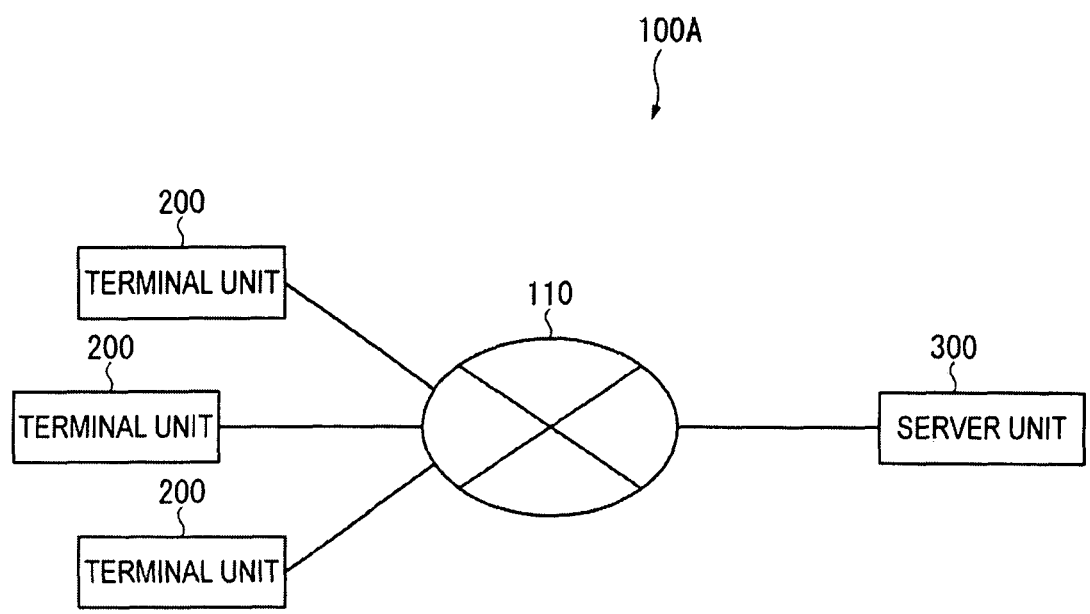
FIG. 16 is a block diagram schematically showing an overall architecture of a lens order system according to a second exemplary embodiment of the invention.

As shown in FIG. 16, a lens order system 100A of the second exemplary embodiment includes the terminal unit 200 and the server unit 300, the terminal unit 200 and the server unit 300 being connected via the network 110 in a data transmittable manner.

Architecture of Terminal Unit

The terminal unit 200 has an architecture substantially the same as the first exemplary embodiment. As shown in FIG. 2, the terminal unit 200 includes a communicating section 210, an input section 220, a display section 230 as a display, a storage 240, a memory 250, a processor 260 and the like. The architectures of the communicating section 210, the input section 220, the display section 230, the storage 240 and the memory 250 are the same as those of the first exemplary embodiment, so that description thereof is omitted.

Figure 17:
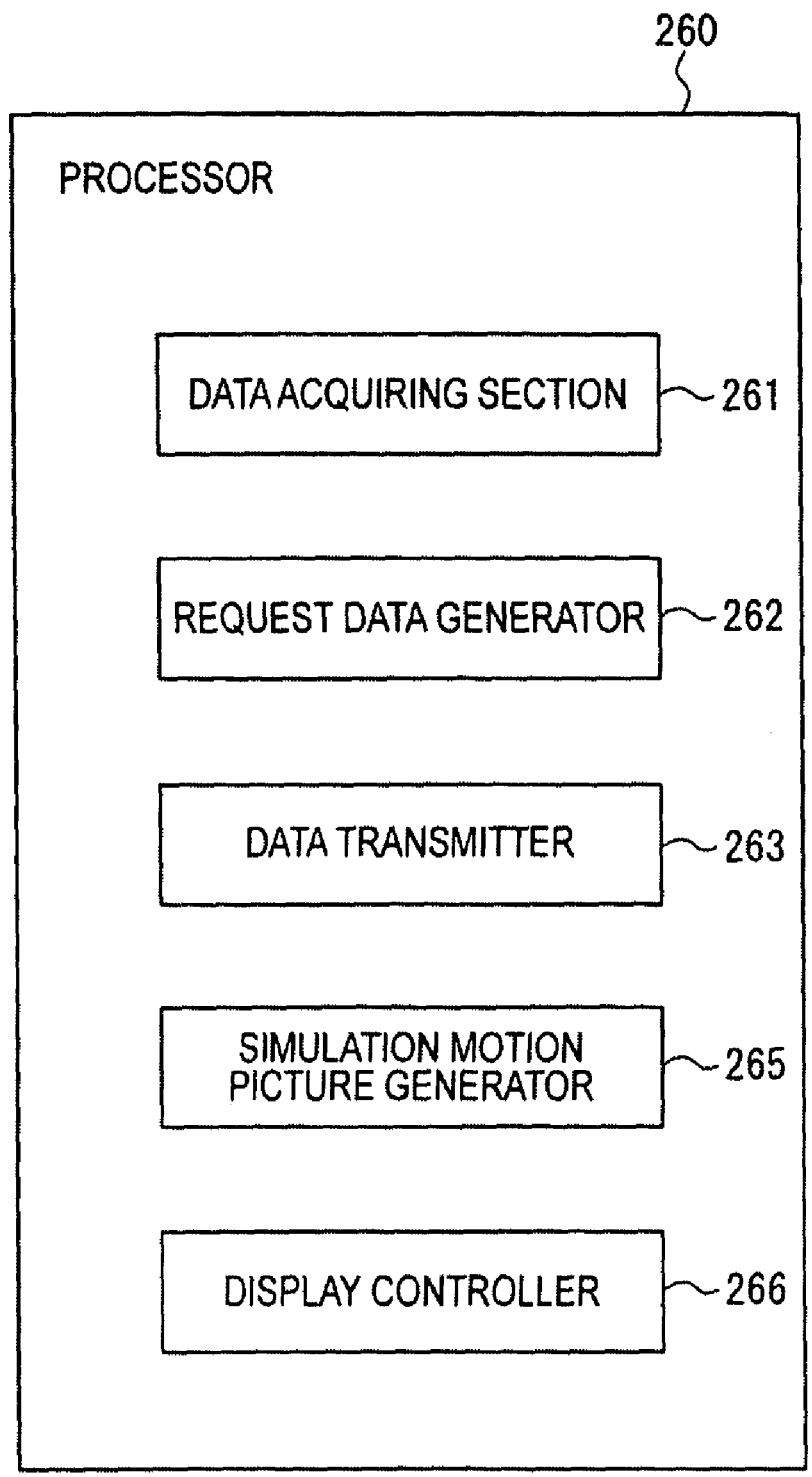
FIG. 17 is a block diagram schematically showing an overall architecture of a processor of the terminal unit of the second exemplary embodiment.

As shown in FIG. 17, the processor 260 of the terminal unit 200 includes a data acquiring section 261, a request data generator 262, a data transmitter 263, a simulation motion picture generator 265, a display controller 266 and the like.

Similarly to the first exemplary embodiment, the data acquiring section 261 recognizes an input signal generated by an input operation made by the user on the input section 220, the data acquiring section 261 also recognizing setting detail data based on the input signal.

Similarly to the first exemplary embodiment, based on the client data setting request data recognized by the data acquiring section 261, the request data generator 262 sets the client ID data 411, the prescription data 412, the lens design data 413, the usage purpose data 414, the unique additional data 415 and the order data 416 to generate the client data 410.

Also similarly to the first exemplary embodiment, when the data acquiring section 261 recognizes transmission request data, the data transmitter 263 controls the communication section 210 to transmit with the server unit 300.

Also similarly to the first exemplary embodiment, the simulation motion picture generator 265 generates the simulation motion picture data 430 based on the client data 410.

Similarly to the first exemplary embodiment, the display controller 266 controls based on the request data recognized by the data acquiring section 261 such that the image of setting screens, simulation motion picture data and the like are displayed on the display section 230.

Architecture of Server Unit

The server unit 300 has an architecture substantially the same as the first exemplary embodiment. As shown in FIG. 9, the server unit 300 includes an interface 310 as a server communicator, an operation section 320, an output section 330, a storage 340, a memory 350 and a server processor 360. Since the interface 310, the operation section 320, the output section 330, the storage 340 and the memory 350 each have an architecture substantially the same as the first exemplary embodiment, the description thereof will be omitted.

Figure 18:
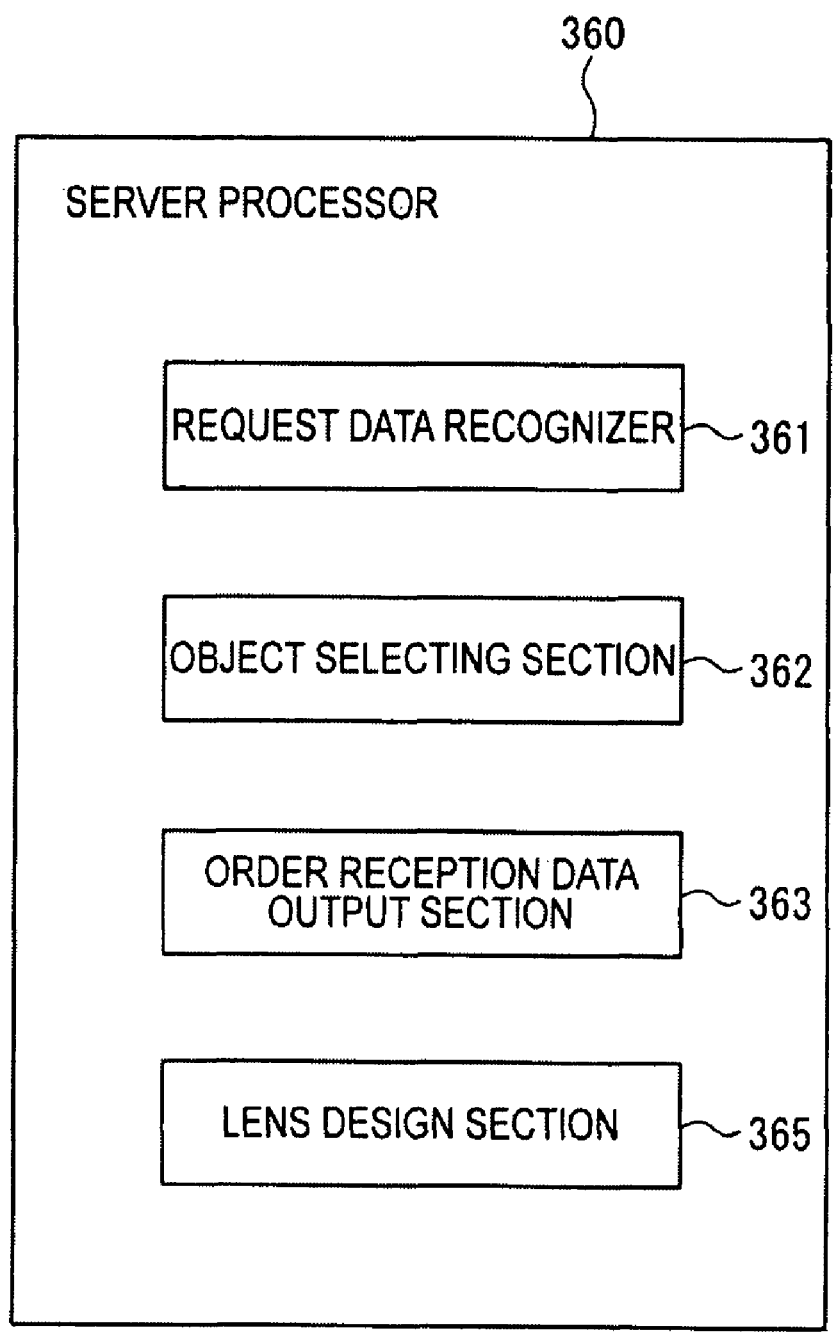
FIG. 18 is a block diagram schematically showing an overall architecture of a server processor of the server unit of the second exemplary embodiment.

As shown in FIG. 18, the server processor 360 of the server unit 300 includes a request data recognizer 361, a lens design section 365, an object selecting section 362 (an image recognizer), a data output section 363 and the like.

Similarly to the first exemplary embodiment, the request data recognizer 361 controls the interface 310 to receive data (e.g. the client data 410) sent from the terminal unit 200 and recognizes the received data. The request data recognizer 361 recognizes the order flag data 417 stored in the order data 416 of the client data 410 sent from the terminal unit 200. The request data recognizer 361 generates the object request data 450 and the order reception data 470 based on the order flag data 417 and readably stores the generated data in the storage 340.

The lens design section 365 conducts the same processing as the lens design section 264 provided to the terminal unit 200 of the first exemplary embodiment. The lens design section 365 designs a lens based on the client data 410 recognized by the request data recognizer 361.

Specifically, the lens design section 365 recognizes the prescription data 412, the lens design data 413, the usage purpose data 414 and the unique additional data 415 of the client data 410.

The lens design section 365 designs the form of the lens based on the lens design data 413. The lens design section 365 determines the distance characteristics of the lens based on the usage purpose data 414. Additionally, based on the prescription data 412 and the unique additional data 415, the lens design section 264 sets the thickness and weight of the lens and the curvature of the lens surface in accordance with the distance characteristics of the lens set as described above.

The lens design section 365 readably stores the ratio of the areas of the distance characteristics of the designed lens, the thickness and weight of the lens, the curvature of the lens surface, the form of the lens and the like in the memory 350 or in the storage 340 as design lens data. At this time, the lens design section 365 adds the generated design lens data to the corresponding object request data 450, order reception data 470 and client data 410 and stores in the object request table 440 or the order reception table 460. Note that the lens design section 365 stores the generated design lens data in a manner associated with the client ID data 411 or ID information identifying the terminal unit 200. The design lens data may be stored in the memory 350 or the storage 240 as data separated from the object request data 450 or the order reception data 470 in a manner associated with the object request data 450 or the order reception data 470.

Similarly to the first exemplary embodiment, the object selecting section 362 selects the scene object data 480 and the lens object data 490 based on the object request data 450.

Also similarly to the first exemplary embodiment, when the order reception data output section 363 recognizes a request signal for outputting the order reception data 470 based on the operation input signal from the operation section 320 for example, the order reception data output section 363 controls the output section 330 to output the order reception data 470 stored in the order reception table 460.

Operation of Lens Order System

Figure 19:
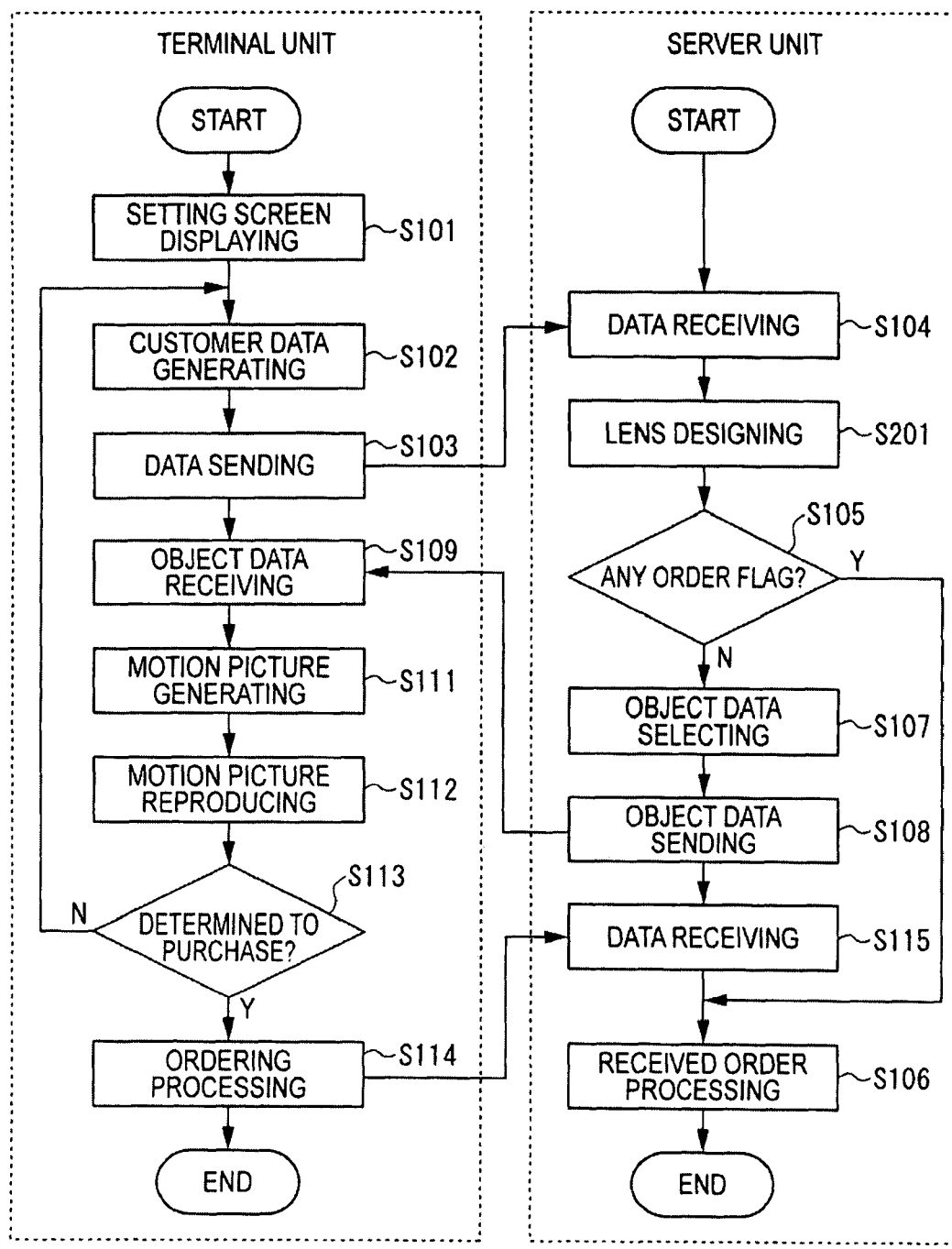
FIG. 19 is a flowchart showing a lens order processing of the lens order system of the second exemplary embodiment.

A lens order processing in the lens order system 100A will be described with reference to FIG. 18. FIG. 19 is a flowchart showing a lens order processing of the lens order system of the second exemplary embodiment.

In FIG. 19, when an input signal for staring a processing relating to a lens order is input by an input operation made on the input section 220 by a user, the terminal unit 200 of the lens order system 100A conducts the lens order processing. Specifically, the display controller 266 of the processor 260 of the terminal unit 200 conducts the same processing in Step S101 of the first exemplary embodiment such that the display section 230 displays an input setting screen.

When the user such as a lens user and a sales person inputs data in the data display frame displayed on the input setting screen by operating the input section 220, the data acquiring section 261 of the processor 260 acquires the input data. The request data generator 262 of the processor 260 conducts the processing in Step S102 and generates the client data 410 based on the recognized data. Specifically, when an input signal for ordering a lens is input by the input operation made on the input section 220 by the user, the request data generator 262 stores, for example, "1" in the order flag data 417. On the other hand, when an input signal for requesting a generation of a simulation motion picture without ordering a lens is recognized, the request data generator 262 stores, for example, "0" in the order flag data 417.

Subsequently, the data transmitter 263 of the processor 260 conducts the processing in Step S103 and controls the communicating section 210 to send the client data 410 generated in Step S102 to a predetermined server unit 300 based on pre-set server destination data. At this time, the data transmitter 263 sends the client data 410 and unique data identifying the terminal unit 200 such as the server user data and password data of the server destination data.

The server unit 300 conducts the processing in Step S104 and when the server unit 300 receives the client data 410 sent from the terminal unit 200, the request data recognizer 361 recognizes the client data 410.

Subsequently, the lens design section 365 of the server processor 360 of the server unit 300 designs a lens based on the client data 410 recognized in Step S104 (Step S201). In other words, the lens design section 365 designs the form of the lens based on the lens design data 413. The lens design section 365 sets a ratio of areas of the lens for seeing a far-distanced, middle-distanced and near-distanced object of the lens based on the usage purpose data 414. Additionally, based on the prescription data 412 and the unique additional data 415, the lens design section 365 sets the thickness and weight of the lens and the curvature of the lens surface for each area for seeing the far, middle and near-distanced object.

The lens design section 365 readably stores the designed ratio of the areas, the thickness and weight of the lens, the curvature of the lens surface, the form of the lens and the like in the memory 350 or the storage 340 as design lens data.

The request data recognizer 361 of the server unit 300 conducts the processing in Step S105 and judges whether or not an order flag is contained by referring to the order flag data 417 of the client data 410 (Step S105).

Specifically, when the request data recognizer 361 judges that data indicating that a lens is ordered (e.g. "1") is stored in the order flag data 417, the request data recognizer 361 conducts the processing in Step S106 and generates the order reception data 470 based on the client data 410. Specifically, the request data recognizer 361 generates the order reception ID data 471 based on unique data identifying a terminal such as the client ID data 411 and server user data of the client data 410 and recognizes a date when the client data 410 is received to generate the order reception date data 472. In addition, the request data recognizer 361 generates the prescription data 473, the lens design data 474, the usage purpose data 475 and the unique additional data 476 based on the prescription data 412, lens design data 413, usage purpose data 414 and unique additional data 415 of the client data 410. The request data recognizer 361 associates the generated data with the design lens data generated in Step S201 to generate and readably store the order reception data 470 in the order reception table 460 of the storage 340.

When a setting input signal for outputting the order reception data 470 stored in the order reception table 460 is input by an operation on the operation section 320 of the server unit 300, the order reception data output section 363 of the server processor 360 controls the output section 330 to output the order reception data 470. Specifically, the order reception data output section 363 displays the order reception data 470 on the display area of the display and prints the order reception data by a printing machine such as a printer.

On the other hand, in Step S105, when the request data recognizer 361 judges that data indicating that no lens is ordered (e.g. "0") is stored in the order flag data 417, the request data recognizer 361 generates the object request data 450 based on the client data 410.

Specifically, the request data recognizer 361 generates the request ID data 451 based on unique data such as the client ID data 411 and server user data of the client data 410 for identifying a terminal and recognizes a date when the client data 410 is received to generate the reception date data 452. In addition, the request data recognizer 361 generates the prescription data 453, the lens design data 454 and the usage purpose data 455 based on the prescription data 412, the lens design data 413 and the usage purpose data 414 of the client data 410. The request data recognizer 361 associates the generated data with the design lens data generated in Step S201 to generate the object request data 450 and readably stores the same in the object request table 440 of the storage 340.

The server processor 360 conducts the processing in Step S107 and selects the scene object data 480 and the lens object data 490 based on the object request data 450.

Subsequently, the object selecting section 362 of the server processor 360 conducts the processing in Step S108 and sends the selected scene object data 480 and lens object data 490 to a predetermined terminal unit 200 based on the unique data identifying the terminal unit 200 such as the server user data sent with the client data 410.

On the other hand, the terminal unit 200 conducts the processing in Step S109 and receives the scene object data 480 and the lens object data 490 sent from the server unit 300 via the data transmitter 263.

Next, when, for example, an operation is made on the input section 220 to select a first reproduction button for reproducing an motion picture of the input setting screen displayed in Step S101 and a request signal for requesting a reproduction of the simulation motion picture data 430 is accordingly input, Step S111 starts. In other words, the simulation motion picture generator 265 of the processor 260 generates the simulation motion picture data 430 based on the client data 410, the design lens data generated in Step S110 and the object data received in Step S109. The simulation motion picture generator 265 readably stores the simulation motion picture data 430 in which the generated motion picture data 432 is associated with the motion picture ID data 431 in the simulation motion picture table 420.

Subsequently, the display controller 266 of the processor 260 conducts the processing in Step S112 and controls the display section 230 such that the motion picture data 432 generated in Step S111 is displayed in real time on the display area as shown in FIGS. 6 to 8.

As described above, the motion picture data 432 shows the lens user's vision of an object with his naked eyes and with the ordered lens based on the vision data of the lens user, the lens user can judge whether or not the ordered lens meets his demands by checking the motion picture data 432.

Subsequent to the check on the motion picture data 432, the data acquiring section 261 of the processor 260 conducts the processing in Step S113 and judges whether or not the order flag data 417 is input by an input operation made on the input section 220 by the user.

In Step S113, when the order button relating to an lens order on the input setting screen is not selected by an input operation made on the input section 220 by the user but an operation for editing the data in the data display frame is conducted, the processing returns to Step S102 where the request data generator 262 of the processor 260 modifies the client data 410.

On the other hand, in Step S112, when the order button relating to an lens order on the input setting screen is selected by an input operation made on the input section 220 by the user to input a setting for ordering a lens, the request data generator 262 conducts the processing in Step S104 and generates the client data 410 in which data indicating that a lens is ordered (e.g. "1") is stored in the order flag data. The generated client data 410 is sent to the server unit 300 together with the unique data such as the server user data for identifying the terminal unit 200.

The server unit 300 conducts the processing in Step S115 and when receiving the client data 410 generated in Step S114, the server unit 300 conducts the processing in Step S106. Specifically, the request data recognizer 361 of the server processor 360 generates the order reception data 470 based on the client data 410 and readably stores the order reception data 470 in the order reception table 460. When the input signal for outputting the order reception data 470 is input, the output section 330 is controlled to output the order reception data 470.

Subsequent to Step S106, the server unit 300 ends the lens order processing. Alternatively, the server unit 300 is set on standby, where the server unit 300 waits for receiving the client data 410 from the terminal unit 200.

On the other hand, the terminal unit 200 ends the lens order processing subsequent to Step S114.

Effects and Advantages of Lens Order System

As stated above, the lens order system 100A of the second exemplary embodiment provides the following effects and advantages in addition to those of the lens order system 100 of the first exemplary embodiment.

Specifically, in the second exemplary embodiment, the data acquiring section 261 of the processor 260 of the terminal unit 200 connected via the network 110 with the server unit 300 recognizes data input from the input section 220; the request data generator 262 generates the client data 410; and the generated client data 410 is sent to the server unit 300. The lens design section 365 of the server unit 300 recognizes the received client data 410, designs the lens based on the client data 410 and generates the design lens data. When data indicating that no lens is ordered is stored in the order flag data 417, the server unit 300 generates the object request data 450 based on the client data 410. Based on the object request data 450, the object selecting section 362 of the server unit 300 selects and sends to the terminal unit 200 the scene object data 480 and the lens object data 490. The simulation motion picture generator 265 of the terminal unit 200 superposes the lens image data 493 on a predetermined composition image and moves the lens image data 493 thereon based on the client data 410, the design lens data, the scene object data and the lens object data, the simulation motion picture generator 265 generating the motion picture data 432 in which the superposing portion 510 of the lens image data 493 and the com- position image is image-processed to show the lens user's vision of the composition image data through the lens. The display controller 266 of the terminal unit 200 controls the display section 230 and conducts a processing for reproducing the motion picture data 432.

Further, when the request data generator 262 of the terminal unit 200 recognizes an input signal for ordering a lens, the request data generator 262 generates the client data 410 in which information for ordering a lens is stored in the order flag data 417 and sends the generated client to the server unit 300. In the server unit 300, when the request data recognizer 361 recognizes that information for ordering a lens is stored in the order flag data 417 of the client data 410, the request data recognizer 361 generates the order reception data 470 based on the client data 410.

Accordingly, similarly to the first exemplary embodiment, before placing an order, the lens user can check the vision through the lens to be ordered with the simulation motion picture data 430. Hence, inconvenience such as a mismatch between the lens desired by the lens user and the actually manufactured lens can be avoided, so that the lens that the lens user truly desires can be securely ordered.

Since the simulation motion picture generator 265 of the terminal unit 200 generates the motion picture data 432 using the scene object data sent from the server unit 300, it is not necessary to store the scene object data 480 in the storage 240 of the terminal unit 200, so that the storage area of the storage 240 can be secured. In addition, since a processing for searching the scene object data 480 stored in the storage 240 is not necessary, processing load in the processing for generating a simulation motion picture can be reduced. Further, since the lens design section 365 of the server unit 300 is provided, a processing for designing the lens on the terminal unit 200 is not necessary, so that the processing load on the terminal unit 200 can be reduced. Hence, even when the terminal unit 200 equipped at a shop has a low CPU performance, the processing time can be shortened, thereby more comfortably assisting the lens selection.

Since the data sent from the terminal unit 200 via the network 110 to the server unit 300 is the client data 410 data-structured in a text format and the data sent from the server unit 300 to the terminal unit 200 is image data of the scene object data 480 and the lens object data 490, the data size can be made small and communication load in data transmission can be reduced, thereby speeding up the processing. Hence, it is possible to provide an appropriate assistance for the lens user to select a lens and to speed up the order processing of the lens.

Modifications of Exemplary Embodiment

An aspect of the invention is not limited to the above exemplary embodiments, but the invention also includes below-described modifications and the like as long as an object of the invention can be achieved.

In the first and second exemplary embodiments, the simulation motion picture generator 265 image-processes the scene object image data 483 of the scene object data 480 based on the vision data, but the architecture is not limited thereto. For example, the scene object table 480A may be adapted to store more specifically classified scene object data 480 based not only on the distance data 482 but also on the vision data such as the visual power and the astigmatic power and the object selecting section 362 may be adapted to select the scene object data 480 in correspondence with the vision data. In such an architecture, it is not necessary to image-process the scene object image data 483 based on the vision data, so that the processing load placed on the processor 260 of the terminal unit 200 can be reduced. Accordingly, the time required for generating the simulation motion picture data 430 can be reduced, thereby realizing a faster and smooth lens order processing.

As another exemplary modification, the whole scene object data may not be image-processed by the vision data, but a simulation of the vision through the lens may be provided by image-processing only a portion superposed with the lens image data based on the vision data and the design lens data. With the displayed simulation, it is possible to check the vision through the lens while comparing with an ideal vision of the scene object (the vision of an emmetrope).

It is effective to check the actual vision of the lens relative to the ideal vision for evaluating of the lens design.

This is particularly effective for a patient with progressed ametropy (progressed myopia, progressed hyperopia and progressed astigmatism). Specifically, in the case of progressed ametropy, when the scene object table is image-processed in accordance with the vision data, the original scene object may extremely blurred or distorted, thereby making it difficult to recognize the scene object.

Further, in the first and second exemplary embodiments, the client data 410 includes the order data 416; information indicating that the lens is ordered is stored in the order flag data 417 of the order data 416; and the client data 410 is sent to the server unit 300 to order the lens. However, the architecture is not limited thereto. For example, the order data 416 may be generated independently of the client data 410.

In this case, by adding the design lens data to the order data 416 to be sent to the server unit 300, it is possible to omit procedure for re-designing the lens when manufacturing by the manufacturer, thereby realizing a faster manufacturing of the lens.

As described above, the order reception data output section 363 of the server unit 300 may control the output section 330 to display the order reception data 470 on the display, may print out the order reception data 470 by a printing machine such as a printer or may conduct another output control. The order reception data output section 363 may output the order reception data 470 directly to a lens manufacturing line of the manufacturer such that the lens can be automatically manufactured based on the order reception data 470 by the lens manufacturing line.

Although the terminal unit 200 is a personal computer set at a shop such as a lens shop in the above exemplary embodiment, the terminal unit 200 may be a personal computer of home use or an electronic device such as a portable phone which can communicate via the network 110 with the server unit 300.

In the exemplary embodiment, the server unit 300 is provided on the manufacturer facility, but, for example, a large server unit may be provided at a head shop of a selling shop i.e. at a relaying position between the shop and the manufacturer.

The simulation motion picture generator 265 is adapted to generate the motion picture data 432 in the exemplary embodiment, but composition image data may be created in which the lens image data 493 is superposed on a composition image. In this architecture, since the simulation motion picture generator 265 only needs to combine scene object data 280 and the lens object data which are sent from the server unit 300 and image-process the superposing portion 510, the processing load on the processor 260 can be further reduced.

An architecture where the lens image data 493 is moved in a predetermined movement direction at a predetermined speed and acceleration based on the lens movement request data is exemplified above, but the lens image data 493 may also be moved toward or from the image data 520, 530, 540. In such an architecture, for example, the simulation motion picture generator 265 increases and decreases the distance stored in the distance data 482 of the scene object data 480 and the image data 520, 530, 540 of the composition image is image-processed in accordance with the increased and decreased distance. Owing to the architecture, the motion picture data 432 that is nearer to the actual state can be generated.

In the first and second embodiments, subsequent to the receiving processing of the object data in Step S109, the processing for designing a lens is conducted by the lens design section 264. However, the lens designing processing may be conducted before the object data is received in Step S109.

The lens design data 413 may be set by selecting from plural types of frame image, or the lens image stored in advance in the storage 240 of the terminal unit 200 in accordance with the input setting by the user or may be set by selecting from plural types of frame image or the lens image sent from the server unit 300.

Although the display controller 266 of the terminal unit 200 is adapted to display the input setting screen on the display area of the display section 230 to prompt a data input in the exemplary embodiment, the input setting screen may be a web browser. In this case, an input setting file for acquiring data which forms the input setting screen and is created by, for example, CGI (Common Gateway Interface) may be stored in the server unit in an accessible manner via a network such that the data can be input by accessing the input setting file provided to the terminal unit 200, thereby sending the client data 410 to the server unit 300.

The above functions are structured as a program in the exemplary embodiment but may be provided as a hardware such as a circuit board or an IC (Integrated Circuit) or as another form. In the architecture in which the functions are read from a program or a recording medium, the handling can be made easy, thereby easily expanding the usage.

In addition, a specific structure and procedure when implementing an aspect of the invention can be changed to another structure and the like without departing from the range of an object of the invention.

A lens order system according to the invention is applicable to a lens order system, a lens order method, a lens order program and a recording medium storing the lens order program by which a lens such as a spectacles lens is ordered.

What is claimed is:

1. A lens order system, comprising:
    a server unit, including:
        a data recognizer that recognizes lens design detail data relating to design details of a lens;
        an image storage that stores object image data relating to an image of an object;
        an image recognizer that recognizes the object image data based on the lens design detail data; and
        an order reception section that recognizes order data relating to an order for a designed lens and generates order reception data, and
    a terminal unit connected with the server unit in a data transmittable manner, the terminal unit including:
        a data acquiring section that acquires the lens design detail data;
        a lens design section that designs the lens based on the lens design detail data;
        an image processor that superposes lens image data relating to an image of the designed lens designed by the lens design section on the object image data sent from the server unit and generates processed image data in which a superposing portion of the object image data and the lens image data is image-processed to provide a vision of the object image data through the designed lens;

a display controller that displays the processed image data on a display; and an order section that generates the order data, wherein the lens design detail data includes vision data on the vision of a lens user, and the image processor generates based on the vision data processed data in which the object image data is image-processed to provide a vision of the object image data of the lens user with naked eyes and superposes the lens image data on the generated processed data to image-process a superposing portion of the processed data and the lens image data to provide a vision of the lens user of the object image data through the designed lens.

2. A lens order system, comprising:

a server unit, including:

a data recognizer that recognizes lens design detail data relating to design details of a lens;

a lens design section that designs the lens based on the lens design detail data;

an image storage that stores object image data relating to an image of an object;

an image recognizer that recognizes the object image data based on the lens design detail data; and an order reception section that recognizes order data relating to an order for the designed lens and generates order reception data, and a terminal unit connected with the server unit in a data transmittable manner, the terminal unit including:

a data acquiring section that acquires the lens design detail data;

an image processor that superposes lens image data relating to an image of the designed lens designed by the lens design section on the object image data sent from the server unit and generates processed image data in which a superposing portion of the object image data and the lens image data is image-processed to provide a vision of the object image data through the designed lens;

a display controller that displays the processed image data on a display; and an order section that generates the order data, wherein the lens design detail data includes vision data on the vision of a lens user, and the image processor generates based on the vision data processed data in which the object image data is image-processed to provide a vision of the object image data of the lens user with naked eyes and superposes the lens image data on the generated processed data to image-process a superposing portion of the processed data and the lens image data to provide a vision of the lens user of the object image data through the designed lens.

3. The lens order system according to claim 1, wherein the image storage stores plural pieces of the lens image data relating to an image of a lens, the image recognizer recognizes, based on the lens design detail data, lens image data of a lens corresponding to the design details of the lens design detail data from the plural pieces of the lens image data, the image processor superposes the lens image data recognized by the image recognizer on the object image data and generates processed image data in which a superposing portion of the object image data and the lens image data is image-processed to provide a vision of the object image data through the designed lens designed based on the lens design detail data.

4. The lens order system according to claim 2, wherein the image storage stores plural pieces of the lens image data relating to an image of a lens, the image recognizer recognizes lens image data of a lens corresponding to the design details of the lens design detail data from the plural pieces of the lens image data based on the lens design detail data, the image processor superposes the lens image data recognized by the image recognizer on the object image data and generates processed image data in which a superposing portion of the object image data and the lens image data is image-processed to provide a vision of the object image data through the designed lens designed based on the lens design detail data.

5. The lens order system according to claim 1, wherein the lens design detail data includes lens prescription data on a lens prescription for a lens user, and the lens design section designs a lens in accordance with the lens prescription of the lens prescription data.

6. The lens order system according to claim 2, wherein the lens design detail data includes lens prescription data on a lens prescription for a lens user, and the lens design section designs a lens in accordance with the lens prescription of the lens prescription data.

7. The lens order system according to claim 1, wherein the lens design detail data includes vision data on the vision of the lens user, and the image storage stores plural pieces of the object image data corresponding to the vision of the lens user, the image recognizer recognizes the object image data corresponding to the vision of the lens user out of the plural pieces of the object image data based on the vision data.

8. The lens order system according to claim 2, wherein the lens design detail data includes vision data on the vision of the lens user, and the image storage stores plural pieces of the object image data corresponding to the vision of the lens user, the image recognizer recognizes the object image data corresponding to the vision of the lens user out of the plural pieces of the object image data based on the vision data.

9. The lens order system according to claim 1, wherein the lens design detail data includes lens form design data on a design of a lens form, and the image processor superposes lens image data corresponding to the lens form of the lens design detail data on the object image data.

10. The lens order system according to claim 2, wherein the lens design detail data includes lens form design data on a design of a lens form, and the image processor superposes lens image data corresponding to the lens form of the lens design detail data on the object image data.

11. The lens order system according to claim 1, wherein the lens design detail data includes lens usage purpose data relating to a usage purpose of the lens by the lens user, the lens design section designs a lens having characteristics corresponding to the usage purpose of the lens of the lens usage purpose data, and the image recognizer recognizes object image data corresponding to the usage purpose of the lens based on the lens usage purpose data.

12. The lens order system according to claim 2, wherein
the lens design detail data includes lens usage purpose data relating to a usage purpose of the lens by the lens user,
the lens design section designs a lens having characteristics corresponding to the usage purpose of the lens of the lens usage purpose data, and
the image recognizer recognizes object image data corresponding to the usage purpose of the lens based on the lens usage purpose data.

13. The lens order system according to claim 11, wherein
the lens usage purpose data is usage distance data relating to a distance to an object to the lens user wearing a lens,
the lens design section designs a lens having distance characteristics corresponding to the distance in which the lens is used of the usage distance data, and
the image recognizer recognizes the object image data relating to an image of an object disposed at a distance corresponding to the usage distance data.

14. The lens order system according to claim 12, wherein
the lens usage purpose data is usage distance data relating to a distance to an object to the lens user wearing a lens,
the lens design section designs a lens having distance characteristics corresponding to the distance in which the lens is used of the usage distance data, and
the image recognizer recognizes the object image data relating to an image of an object disposed at a distance corresponding to the usage distance data.

15. The lens order system according to claim 1, wherein
the image processor superposes the lens image data on the object image data and generates motion picture data to be moved on the object image data.

16. The lens order system according to claim 2, wherein
the image processor superposes the lens image data on the object image data and generates motion picture data to be moved on the object image data.

17. The lens order system according to claim 15, wherein
the terminal unit includes a lens movement request recognizer that recognizes lens movement request data relating to a movement of the lens of the motion picture data, and
based on the lens movement request data, the image processor generates motion picture data on which the lens image data is moved in a predetermined movement.

18. The lens order system according to claim 16, wherein
the terminal unit includes a lens movement request recognizer that recognizes lens movement request data relating to a movement of the lens of the motion picture data, and
based on the lens movement request data, the image processor generates motion picture data on which the lens image data is moved in a predetermined movement.

19. A lens order method, comprising:
in a terminal unit connected to a server unit in a data transmittable manner:
  acquiring lens design detail data relating to setting details of a lens; and
  sending the lens design detail data to the server,
in the server unit:
  recognizing the lens design detail data relating to the setting details of the lens sent from the terminal unit;
  recognizing object image data relating to an object image to be seen through the lens based on the lens design detail data; and
  sending the recognized object image data to the terminal unit,
in the terminal unit:
  designing the lens based on the lens design detail data;
  superposing lens image data relating to an image of the designed lens on the object image data sent from the server unit and generating processed image data in which a superposing portion of the object image data and the lens image data is image-processed to provide a vision of the object image data through the designed lens;
  displaying the generated processed image data on a display;
  generating order data relating to an order for the designed lens; and
  sending the order data to the server unit, and
in the server unit:
  receiving the order data; and
  generating received data,
wherein the lens design detail data includes vision data on the vision of a lens user,
based on the vision data, processed data in which the object image data is image-processed to provide a vision of the object image data of the lens user with naked eyes is generated, and
the lens image data is superposed on the generated processed data to image-process a superposing portion of the processed data and the lens image data to provide a vision of the lens user of the object image data through the designed lens.

20. A lens order method, comprising:
in a terminal unit connected to a server unit in a data transmittable manner,
  acquiring lens design detail data relating to setting details of a lens; and
  sending the lens design detail data to the server,
in the server unit:
  recognizing the lens design detail data relating to the setting details of the lens sent from the terminal unit;
  designing the lens based on the lens design detail data;
  recognizing object image data relating to an object image to be seen through the lens; and
  sending the recognized object image data and lens image data relating to the designed lens to the terminal unit,
in the terminal unit:
  superposing the lens image data on the object image data based on the object image data and the lens image data which are sent from the server unit;
  generating processed image data in which a superposing portion of the object image data and the lens image data is image-processed to provide a vision of the object image data through the designed lens;
  displaying the generated processed image data on a display;
  generating order data relating to an order for the designed lens; and
  sending the order data to the server unit, and
in the server unit,
  receiving the order data; and
  generating received data,
wherein the lens design detail data includes vision data on the vision of a lens user,
based on the vision data, processed data in which the object image data is image-processed to provide a vision of the object image data of the lens user with naked eyes is generated, and
the lens image data is superposed on the generated processed data to image-process a superposing portion of the processed data and the lens image data to provide a vision of the lens user of the object image data through the designed lens.

* * * * *